(12) United States Patent
Maeda et al.

(10) Patent No.: US 12,400,173 B2
(45) Date of Patent: Aug. 26, 2025

(54) INFORMATION MANAGEMENT APPARATUS AND INFORMATION MANAGEMENT PROGRAM USING AN INSPECTION RESULT

(71) Applicant: KABUSHIKI KAISHA TOSHIBA, Tokyo (JP)

(72) Inventors: Masaya Maeda, Kawasaki (JP); Akihisa Takada, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 33 days.

(21) Appl. No.: 17/457,712

(22) Filed: Dec. 6, 2021

(65) Prior Publication Data
US 2022/0092533 A1 Mar. 24, 2022

Related U.S. Application Data

(63) Continuation of application No. PCT/JP2020/020127, filed on May 21, 2020.

(30) Foreign Application Priority Data

Jun. 6, 2019 (JP) ................. 2019-106440

(51) Int. Cl.
*G06Q 10/0833* (2023.01)
*G06F 3/14* (2006.01)
(Continued)

(52) U.S. Cl.
CPC ........... *G06Q 10/0833* (2013.01); *G06F 3/14* (2013.01); *G06Q 10/0838* (2013.01); *G06T 7/0002* (2013.01)

(58) Field of Classification Search
CPC ........... G06Q 10/0833; G06Q 10/0838; G06Q 10/083
See application file for complete search history.

(56) References Cited

U.S. PATENT DOCUMENTS 6,189,702 B1 * 2/2001 Bonnet ................. B65G 47/82
198/748
6,373,520 B1 * 4/2002 Cadieux, Jr. ....... G01N 21/8806
348/125

(Continued)

FOREIGN PATENT DOCUMENTS

CN       107169703 A    9/2017
EP       3 273 394 A1   1/2018
(Continued)

OTHER PUBLICATIONS

Lyu, S., Tu, X., & Lu, Y. (2018). X-ray image classification for parcel inspection in high-speed sorting line. 2018 11th International Congress on Image and Signal Processing, BioMedical Engineering and Informatics (CISP-BMEI). https://doi.org/10.1109/cisp-bmei.2018.8633215 (Year: 2018).*

(Continued)

*Primary Examiner* — Shannon S Campbell
*Assistant Examiner* — Manal A. Alsamiri
(74) *Attorney, Agent, or Firm* — Maier & Maier, PLLC

(57) ABSTRACT

According to an embodiment, a communication control device includes a communication interface, a memory and a processor. The communication interface communicates with an information acquisition apparatus and an inspection apparatus. The memory stores information of the parcel acquired from the information acquisition apparatus, and an inspection result in each of the stages for the parcel, the inspection result being acquired from the inspection apparatus. The processor extracts, as a target parcel, a parcel with respect to which information designated for searching information stored in the memory agrees with part of the information of the parcel stored in the memory, and causes a display device to display a present position of the target parcel, based on the inspection result in each of the stages for the target parcel.

14 Claims, 17 Drawing Sheets

(51) Int. Cl.
*G06Q 10/083* (2024.01)
*G06T 7/00* (2017.01)

(56) References Cited

U.S. PATENT DOCUMENTS

| | | | | |
|---|---|---|---|---|
| 7,193,515 | B1* | 3/2007 | Roberts | B64F 1/368 |
| | | | | 340/568.1 |
| 2003/0167240 | A1* | 9/2003 | Napier | G06Q 10/08 |
| | | | | 705/404 |
| 2006/0043174 | A1* | 3/2006 | Banavar | G06K 17/00 |
| | | | | 235/383 |
| 2010/0082152 | A1* | 4/2010 | Mishra | H04N 7/18 |
| | | | | 700/226 |
| 2010/0156611 | A1 | 6/2010 | Tsujimoto et al. | |
| 2011/0299726 | A1* | 12/2011 | Lubben | G07B 17/00661 |
| | | | | 382/101 |
| 2013/0325893 | A1* | 12/2013 | Asay | G06Q 10/083 |
| | | | | 707/769 |
| 2015/0186839 | A1 | 7/2015 | Chen et al. | |
| 2017/0008655 | A1* | 1/2017 | Amano | B65H 16/103 |
| 2017/0074002 | A1 | 3/2017 | Cooper | |
| 2017/0132489 | A1* | 5/2017 | Simgi | G06Q 50/60 |
| 2018/0300668 | A1* | 10/2018 | Farley | G06N 20/00 |
| 2018/0341914 | A1* | 11/2018 | Levy | G06K 7/10297 |
| 2019/0135552 | A1 | 5/2019 | Martono et al. | |
| 2019/0152634 | A1* | 5/2019 | Almogy | B65B 43/54 |
| 2020/0218918 | A1* | 7/2020 | Moriyama | B07C 3/00 |
| 2020/0398515 | A1* | 12/2020 | Fornos Jove | B65H 29/58 |
| 2021/0181124 | A1 | 6/2021 | Watanabe et al. | |

FOREIGN PATENT DOCUMENTS

| | | |
|---|---|---|
| JP | 2001-306659 A | 11/2001 |
| JP | 2002-362730 A | 12/2002 |
| JP | 3387760 B2 | 3/2003 |
| JP | 2004-178258 A | 6/2004 |
| JP | 2005-289634 A | 10/2005 |
| JP | 2006-505020 A | 2/2006 |
| JP | 2010-152455 A | 7/2010 |
| JP | 2016170791 A | 9/2016 |
| JP | 2017-532691 A | 11/2017 |
| JP | 2018-13939 A | 1/2018 |
| JP | 2019-40410 A | 3/2019 |
| JP | 2020-42335 A | 3/2020 |
| KR | 20100086809 A | 8/2010 |

OTHER PUBLICATIONS

European Search Report issued on Dec. 6, 2022, in corresponding European Application No. 20819479.5, 6 pages.
International Search Report issued Sep. 1, 2020 in PCT/JP2020/020127, filed on May 21, 2020, 3 pages.
Office Action issued Jul. 10, 2023, in corresponding Singapore Application No. 11202113499T, 10 pages.

* cited by examiner

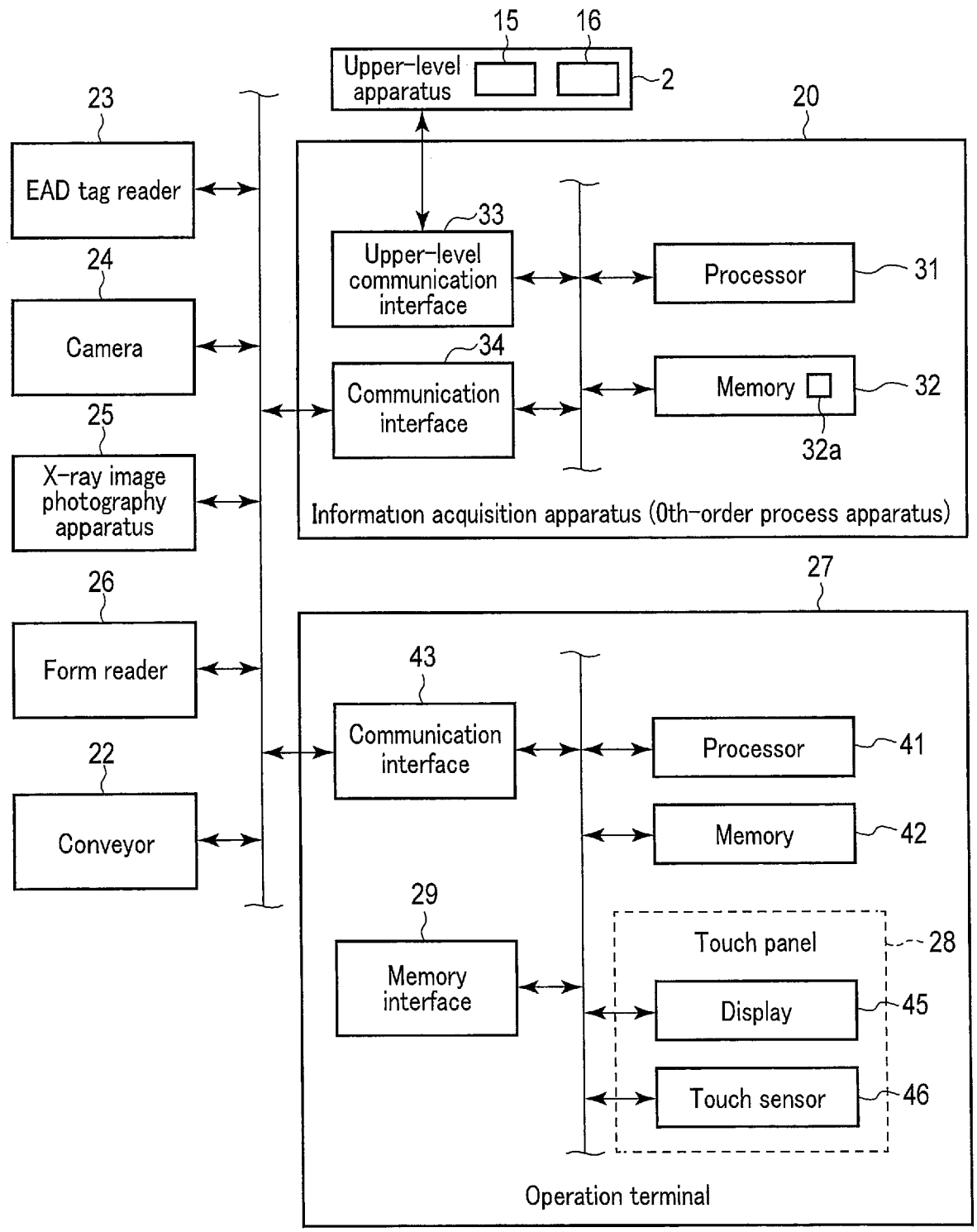
F I G. 4

| Reception No. | Parcel ID | Sender information | Destination information | Article name | Others | Parcel image | X-ray image |
|---|---|---|---|---|---|---|---|
| 20180728_080102_1 | 1234567 | | | Food | Canned fish | xxx.xxx | yyy.yyy |
| 20180728_080103_1 | 2345678 | | | Mechanical component | | | |
| 20180728_080104_1 | 3456789 | | | Clothing | | | |
| 20180728_080105_1 | 4567890 | | | Electronic equipment | | | |
| 20180728_080106_1 | 5678901 | | | Food | Beef (frozen) | | |

F I G. 9

80

| Reception No. (provisional ID) | Sender information | Destination information | Article name | Others | External appearance image |
|---|---|---|---|---|---|
| | | | | | |
| | | | | | |
| | | | | | |
| | | | | | |

Table of data sets with no parcel ID (failure data)

Return

FIG. 11

| Reception No. | Parcel ID | Primary inspection result | Primary inspection | Primary inspection processing date/time | Secondary inspection result | Secondary inspection | Secondary inspection processing date/time |
|---|---|---|---|---|---|---|---|
| 20180728_080102_1 | 1234567 | OK | No abnormality | 20180728_082133 | | | |
| 20180728_080103_1 | 2345678 | NG | X-ray | 20180728_082344 | OK | No abnormality | 20180728_110100 |
| 20180728_080104_1 | 3456789 | NG | EAD confirmation | 20180728_082555 | OK | No abnormality | 20180728_111010 |
| 20180728_080105_1 | 4567890 | NG | Dog inspection | 20180728_082800 | NG | Explosive | 20180728_111620 |
| 20180728_080106_1 | 5678901 | NG | Application form | 20180728_082911 | NG | Prohibited article | 20180728_112130 |

F I G. 13

| Image data | Primary inspection result | Secondary inspection result | Processing status of parcel | Present position of parcel |
|---|---|---|---|---|
| Absent | — | — | Before 0th-order process | 0th-order work site |
| Present | — | — | Conveyance to primary inspection site | Conveyance path between 0th-order work site and primary inspection site |
| Present | OK | — | End of inspection | Sorter |
| Present | NG | — | Conveyance to secondary inspection site | Conveyance path between primary inspection site and secondary inspection site |
| Present | NG | OK | End of inspection | Sorter |
| Present | NG | NG | End of inspection | Reject |

F I G. 16

INFORMATION MANAGEMENT APPARATUS AND INFORMATION MANAGEMENT PROGRAM USING AN INSPECTION RESULT

CROSS REFERENCE TO RELATED APPLICATIONS

This application is a Continuation Application of PCT Application No. PCT/JP2020/020127, filed May 21, 2020 and based upon and claiming the benefit of priority from Japanese Patent Application No. 2019-106440, filed Jun. 6, 2019, the entire contents of all of which are incorporated herein by reference.

FIELD

Embodiments of the present invention relate to an information management apparatus and an information management program.

BACKGROUND

Conventionally, there is known an inspection system in which an operator inspects an image of an external appearance (external appearance image) and a photograph image, by X-rays (X-ray image) of a parcel, and the parcel is sorted based on the inspection result of the operator. In some cases, the inspection system executes, in different places, various processes including inspections of multiple stages. For example, in some cases, the inspection system executes, in different places, a process of acquiring information from a parcel, a process of visually confirming the parcel, and a process of inspecting in detail the content of the parcel by opening the wrapping of the parcel.

In the conventional inspection system, the information relating to the parcel, including the inspection result, is managed by being stored in a database. However, the present whereabouts of the actual parcel is not managed. Thus, in the conventional inspection apparatus, it is not easy to confirm the present position of a specific parcel, and it is difficult to search the specific parcel.

CITATION LIST

Patent document 1: Jpn. Pat. Appln. KOKAI Publication No. 2018-13939

SUMMARY

Technical Problem

The object of the present invention is to provide an information management apparatus and an information management program, which can easily search a condition of a parcel.

Solution to Problem

According to an embodiment, a communication control device includes a communication interface, a memory and a processor. The communication interface communicates with an information acquisition apparatus configured to acquire information of a parcel, and communicates with an inspection apparatus configured to inspect the parcel in each of stages. The memory stores, via the communication interface, information of the parcel acquired from the information acquisition apparatus, and an inspection result in each of the stages for the parcel, the inspection result being acquired from the inspection apparatus. The processor extracts, as a target parcel, a parcel with respect to which information designated for searching information stored in the memory agrees with part of the information of the parcel stored in the memory, and causes a display device to display a present position of the target parcel, based on the inspection result in each of the stages for the target parcel.

BRIEF DESCRIPTION OF THE DRAWINGS

FIG. 4 is a block diagram illustrating a configuration example of a control system of the 0th-order process system in the inspection system according to the embodiment.

FIG. 9 is a view illustrating an example of a database generated by information which the 0th-order process system of the inspection system according to the embodiment collects.

FIG. 11 is a view illustrating a display example of a list of failure data in which parcel IDs are not registered in a primary inspection in the inspection system according to the embodiment.

FIG. 13 is a view illustrating an example of a database in which information is registered by the primary inspection process of the inspection system according to the embodiment.

FIG. 16 is a table for searching the present position of a parcel in the search process by the upper-level apparatus functioning as the information management apparatus according to the embodiment.

DETAILED DESCRIPTION

Hereinafter, embodiments will be described with reference to the accompanying drawings.

Figure 1:
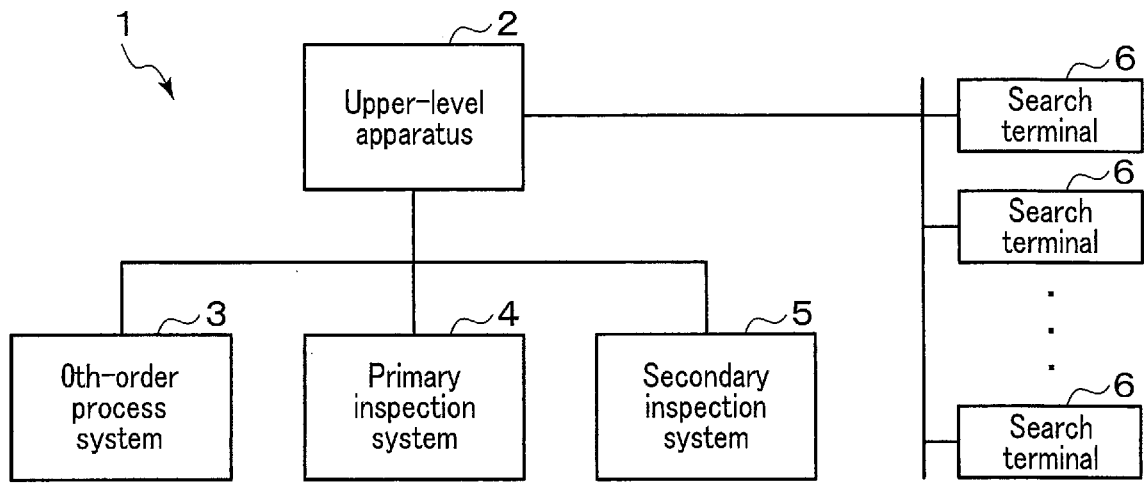
FIG. 1 is a block diagram schematically illustrating a whole configuration of an inspection system according to an embodiment.

FIG. 1 is an explanatory view for describing a schematic configuration example of an inspection system 1 according to an embodiment.

The inspection system 1 is a system for inspecting articles such as parcels, which are inspection targets. The inspection system 1 performs an inspection for discovering, for example, an article including a controlled item or a taxable item, and an article (parcel) of a specific sender or a specific receiver. For example, it is assumed that the controlled items are an article, the import of which to the country is controlled, an article, the export of which to foreign countries is controlled, and the like. Note that it is assumed that the controlled items, the import of which to the country is controlled and the export of which to foreign countries is controlled, are, for instance, arms, drugs, animals, plants, and the like.

In the inspection system 1 according to the present embodiment, the articles that are inspection targets are not limited to parcels. However, in the following description, it is assumed that the articles are parcels. A form and a tag are attached to a parcel that is an article of the inspection target. Examples of the form include an address form indicative of a sender and a receiver of the parcel, and an article content application form indicative of the content. The tag is information indicative of identification information allocated to the parcel, and a bar code, in which identification information is coded, may be printed on the tag, or the tag may be an RFID (Radio Frequency Identifier) tag which stores identification information allocated to the parcel or stores an inspection result by another inspection organization or the like. However, depending on a parcel that is the inspection target, there is a case in which the tag is not attached to the parcel.

In the configuration example illustrated in FIG. 1, the inspection system 1 includes an upper-level apparatus 2, a 0th-order process system 3, a primary inspection system 4, and a secondary inspection system 5. In addition, search terminals 6 for confirming positions of parcels and the information of parcels are communicably connected to the upper-level apparatus 2.

The upper-level apparatus 2 is an information management apparatus for managing information in the inspection system 1. The upper-level apparatus 2 manages information relating to parcels that are inspection targets. For example, the upper-level apparatus 2 stores, in a database, advance data that is information relating to parcels to be inspected, and updates the database storing the information including inspection results relating to the parcels, based on the information acquired from the respective systems 3, 4 and 5.

The 0th-order process system 3 is an information acquisition system which acquires information for inspecting parcels. The 0th-order process system 3 acquires various kinds of information from parcels which are conveyed by a conveyor, and registers the acquired information in the database provided in the upper-level apparatus 2. For example, the 0th-order process system 3 acquires, from each parcel, tag information, form information, an external appearance image, and an X-ray image. The 0th-order process system 3 correlates, and registers in the database, the tag information, form information, external appearance image and X-ray image acquired from each parcel, and identification information (ID) allocated to each parcel or acquired from each parcel.

The primary inspection system 4 is a system which inspects each parcel, based on the information registered by the 0th-order process system. The primary inspection system 4 presents to an operator the information acquired by the 0th-order process with respect to each parcel, and accepts an input of an inspection result of the parcel by the operator. For example, the primary inspection system 4 displays, on a display device, the tag information, form information, external appearance image and X-ray image acquired from the parcel that is the inspection target. The operator visually recognizes the displayed information, and classifies the parcels into a parcel that requires a secondary inspection and a parcel that does not require the secondary inspection.

For example, the operator determines that a parcel, which is suspected to include a controlled item, requires the secondary inspection, and inputs, by an operation terminal, the determination result that the secondary inspection is necessary. In addition, also when information that requires a secondary inspection is included in the information described in the form, such as the sender information, receiver (address) information, article content, or the like, the operator determines that the secondary inspection is necessary, and inputs, by the operation terminal, the determination result that the secondary inspection is necessary. Besides, when the operator determines that the parcel is a normal article (the inspection is passed), the operator inputs, by the operation terminal, the determination result that the inspection result for the parcel is normal.

A parcel, which was determined to require the secondary inspection in the primary inspection system 4, is sent to a secondary inspection site where the secondary inspection system 5 is installed. In addition, a parcel, which was determined to be normal in the primary inspection system 4, is sent to a site for processing the parcel that was determined to be normal. Note that, in the present embodiment, it is assumed that the parcel determined to be normal in the primary inspection system 4 or secondary inspection system 5 is sent to an address sorting apparatus (hereinafter, also referred to simply as "sorter") which sorts the parcel according to the address described on the form.

The secondary inspection system 5 inspects in detail the parcel that was determined to require the secondary inspection in the primary processing system. For example, in the secondary inspection system 5, the operator unpacks the parcel and inspects the content of the parcel in detail. The secondary inspection system 5 displays the result of the primary inspection in the primary inspection system 4 and the information acquired in the 0th-order process, and accepts an input of information indicative of the result of the detailed inspection of the unpacked parcel by the operator.

For example, in the secondary inspection system 5, when it is confirmed that a controlled item is included in the parcel, the operator inputs, by the operation terminal, the confirmation result that the article is a parcel that is to be rejected. In addition, when the operator confirmed, as the inspection result of the unpacked parcel, that the parcel does not include a controlled item and is a normal parcel, the operator inputs, by the operation terminal, the confirmation result that the inspection result for the parcel is normal.

Next, the configuration of the upper-level apparatus 2 will be described.

Figure 2:
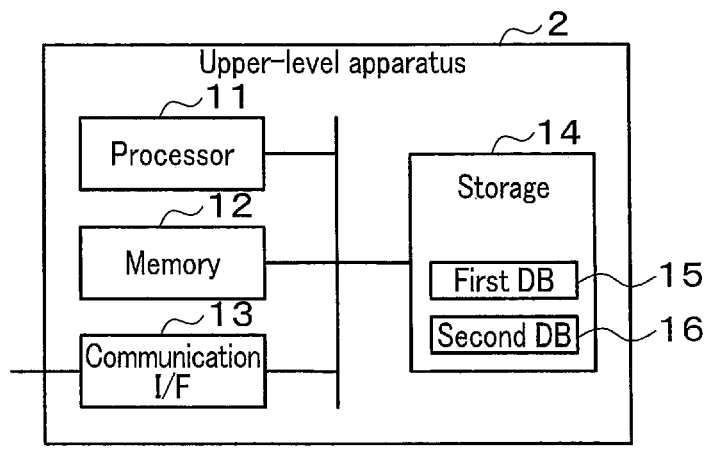
FIG. 2 is a block diagram illustrating a configuration example of an upper-level apparatus in the inspection system according to the embodiment.

FIG. 2 is a block diagram illustrating a configuration example of the upper-level apparatus 2.

The upper-level apparatus 2 is an information management apparatus which manages the information of the entirety of the inspection system 1. The upper-level apparatus 2 is a computer that is communicably connected to the systems 3, 4 and 5. The upper-level apparatus 2 is composed of, for example, a server apparatus.

In the configuration example illustrated in FIG. 2, the upper-level apparatus 2 includes a processor 11, a memory 12, a communication interface 13, and a storage 14.

The processor 11 executes an arithmetic process. The processor 11 is composed as, for example, a CPU. The processor 11 implements various processes by executing programs stored in the memory 12.

The memory 12 is a storage device which stores programs and data. The memory 12 includes, for example, a ROM that is a read-only nonvolatile memory, a RAM that temporarily stores data, and a rewritable nonvolatile memory.

The processor 11 functions as a processing unit which executes various processes by executing, with use of the RAM, the programs stored in the ROM or nonvolatile memory in the memory 12.

The communication interface 13 is an interface for communicating with the 0th-order process system 3, primary inspection system 4 and secondary inspection system 5. The communication interface 13 may include communication interfaces for the systems 3, 4 and 5, respectively. In addition, the communication interface 13 also functions as an interface which communicates with the search terminal 6 which the operator operates in order to confirm the position of a specific parcel or the inspection state of the parcel. In this case, the communication interface 13 may be an interface which communicates with the search terminal 6 via a network. Note that the interface communicating with the search terminal 6 may be provided separately from the communication interface 13. For example, a wireless communication interface for wirelessly communicating with the search terminal 6, which is carried by an inspector, may be provided.

The storage 14 is a storage device including a rewritable nonvolatile memory. The storage 14 is composed of, for example, a hard disk drive (HDD), or a solid state drive (SSD). The storage 14 includes a first database 15 and a second database 16.

The first database 15 is a database which stores information (advance data) relating to parcels that are inspection targets. For example, the advance data stored in the first database 15 may be read from a storage medium such as a portable storage device, may be acquired via a communication line, or may be input by the operator.

The second database 16 is a database which stores information acquired from parcels that are inspection targets, and information indicative of inspection results or the like. For example, the second database 16 correlates and registers the advance data registered in the first database 15 and the information (tag information, external appearance image, X-ray image, and form information) acquired by the 0th-order process system 3, with the identification information. In addition, the information indicative of the inspection results by the primary inspection system 4 and secondary inspection system 5 is registered in the second database 16.

The data amount that the second database 16 stores increases each time the inspection of parcels is performed. Thus, the data registered in the second database 16 may be deleted according to a preset specific rule, thereby to reduce the stored data amount and to improve the precision of a search function. For example, the data stored in the second database 16 may be periodically deleted in the order from the oldest data.

In addition, in the second database 16, information (data set) relating to a parcel (a finally rejected parcel), which was determined to be NG in the secondary inspection, may not be deleted. For example, a flag indicative of the prohibition of deletion is set for the information (data set) relating to the parcel (finally rejected parcel) which was determined to be NG in the secondary inspection, thereby to prevent the deletion of the information (data set). Besides, the information (data set) relating to the parcel (finally rejected parcel), which was determined to be NG in the secondary inspection, may be copied and stored in a storage area that is provided separately from the second database 16, thereby to prevent the deletion of the information (data set).

Next, a description will be given of a configuration of the 0th-order process system (information acquisition system) 3 according to the embodiment.

Figure 3:
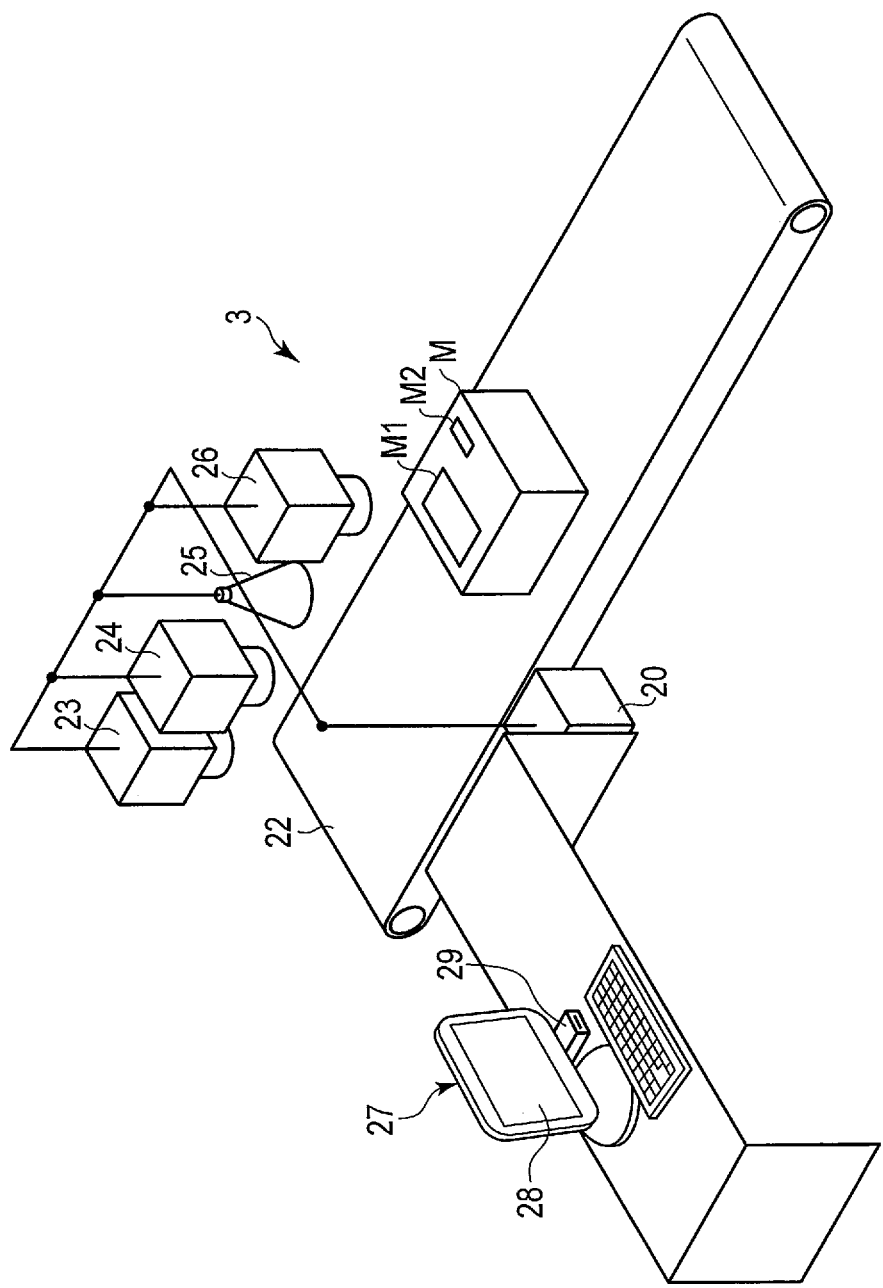
FIG. 3 is a view illustrating a configuration example of a 0th-order process system in the inspection system according to the embodiment.

FIG. 3 is a view schematically illustrating a configuration example of the 0th-order process system 3 according to the embodiment.

The 0th-order process system 3 includes an information acquisition apparatus (0th-order process apparatus) 20, a conveyor 22, a tag reader 23, a camera 24, an X-ray photography apparatus 25, a form reader 26, and an operation terminal 27. The information acquisition apparatus 20 is configured to be communicable with the conveyor 22, tag reader 23, camera 24, X-ray photography apparatus 25, form reader 26 and operation terminal 27.

As illustrated in FIG. 3, a form M1 and a tag M2 are attached to a parcel M that is an example of an article which is an inspection target of the inspection system 1. The form M1 includes, for example, a destination form indicative of a sender and a destination of the parcel, and an article content application form indicative of the content. The destination form describes destination information indicative of the address of the destination, receiver information indicative of the receiver, sender address information indicative of the address of the sender, and sender information indicative of the sender. The article content application form describes information indicative of an article included in the parcel M which the sender declares.

In addition, the tag M2 is indicative of tag information including the identification information (the identification information of the article) serving as a parcel ID allocated to the parcel M. For example, a bar code indicative of the tag information including the identification information may be printed on the tag M2, or the tag M2 may be an RFID tag which stores identification information allocated to the parcel or stores an inspection result by another inspection organization or the like, and the tag M2 is attached to the surface of the parcel M. In the present embodiment, it is assumed that the bar code indicative of the tag information including the identification information is printed on the tag M2. However, depending on the parcel M that is the inspection target, there is a case in which the tag M2 is not attached to the parcel M.

The tag M2 is, for example, an Electronic Advance Data (EAD) tag. The EAD tag is, for example, a tag on which an identification code (EAD identification code) included in EAD information that is an inspection result in the custom house of another country is printed. In this case, the tag M2 may be a tag on which the tag information including identification information, such as an EAD identification code, is printed as a bar code. The EAD information is information including information (content information) or the like, which is indicative of an EAD identification code, address/name information, an item name and a weight of the content, and the like. The address/name information is, for example, information (receiver information) indicative of the receiver (destination) of the parcel M, and/or information (sender information) indicative of the sender.

The conveyor 22 is an apparatus which conveys the parcel M that is the inspection target. In the process (0th-order process) in the 0th-order process system 3, various kinds of information are acquired from the parcel M that is conveyed in a predetermined direction. Thus, the conveyor 22 conveys the parcel M such that the parcel M passes through positions where various kinds of devices acquire various kinds of information. Specifically, the conveyor 22 conveys the parcel M in a predetermined direction such that the parcel M passes through positions (photography positions) where the tag reader 23, camera 24, X-ray photography apparatus 25 and form reader 26 acquire information. In addition, the conveyor 22 moves the parcel M at such a conveyance speed that the tag reader 23, camera 24, X-ray photography apparatus 25 and form reader 26 can surely acquire information. Furthermore, the parcel M, which has been conveyed by the conveyor 22 and has passed through the photography positions of the tag reader 23, camera 24, X-ray photography apparatus 25 and form reader 26, is sent to the primary inspection system 4.

Note that an end portion on the upstream side of the conveyor 22 may be configured such that the parcel M is supplied by a robot arm or the like. In addition, an automated guided vehicle (AGV) or the like for sending the parcel M, for which the 0th-order process was finished, to the primary inspection system 4 may be disposed on an end portion on the downstream side of the conveyor 22.

The tag reader 23 reads the tag M2 from the parcel M that is being conveyed by the conveyor 22. It is assumed that the tag M2 includes identification information. The tag reader 23 reads the identification information from the tag M2, and supplies the read identification information to the information acquisition apparatus 20. For example, in such an operational implementation that the bar code indicative of the identification information is printed on the tag M2, the tag reader 23 is configured as a bar code reader. For example, the tag M2 is an EAD tag. In this case, the tag reader 23 reads the EAD identification code from the EAD tag as the tag M2.

The camera 24 acquires (captures) an image (an external appearance image, an exterior image) of the external appearance (exterior) of the parcel M that is conveyed by the conveyor 22. The camera 24 supplies the acquired external appearance image of the parcel M to the information acquisition apparatus 20. For example, the camera 24 is composed of a combination between a lens and an imaging element which converts light focused by the lens into an image. The camera 24 may be configured to capture the external appearance image, not only from an upward direction relative to the parcel M, but also from a direction other than the upward direction.

The X-ray photography apparatus 25 acquires an X-ray image of the parcel M that is conveyed by the conveyor 22. The X-ray photography apparatus 25 supplies the acquired X-ray image of the parcel M to the information acquisition apparatus 20. For example, the X-ray photography apparatus 25 is composed of a combination between an X-ray tube which radiates X-rays to the parcel M, and an X-ray detector which detects the X-rays that have passed through the parcel M. The X-ray photography apparatus 25 may be configured to radiate X-rays not only in one direction but also in multiple directions, thereby to capture a plurality of X-ray images.

The form reader 26 reads various kinds of information from the form M1 attached to the parcel M that is conveyed by the conveyor 22. For example, the form reader 26 acquires information, such as receiver information and sender information, from the address form of the form M1, and acquires information indicative of the content of the parcel from the article content application form of the form M1. It is assumed that the information read by the form reader 26 from the form M1 is called "form information". The form reader 26 supplies the form information, which is read from the form M1 attached to the parcel M, to the information acquisition apparatus 20.

For example, the form reader 26 includes a line image sensor. The line image sensor includes an imaging element in which pixels that convert light to an image are arranged in a line shape, and a lens which focuses light on the pixels, and the line image sensor acquires an image (form image) of the form M1. In addition, the form reader 26 includes a processor which executes an optical character recognition process (OCR) of recognizing form information, such as the receiver information, sender information and the information of the content, from the form image read by the line image sensor. It is assumed that dictionary data, which is used for OCR by the form reader 26, is stored in the memory of the information acquisition apparatus 20.

The operation terminal 27 generates a signal (operation signal) corresponding to an operation input of the operator, and supplies the operation signal to the information acquisition apparatus 20. In addition, the operation terminal 27 includes a touch panel 28 functioning as a user interface. The touch panel 28 includes a display which provides various kinds of information to the operator, and a touch sensor which accepts an operation instruction that is input by the operator touching the screen. Furthermore, a memory interface (I/F) 29 for a connection to an external memory is connected to the operation terminal 27. The memory I/F 29 is a device which executes an input/output of data from/to an external memory device. Note that the operation terminal 27 may be configured to function as the search terminal 6 which executes an input of a search key and executes display of information as a search result, as will be described later.

Next, a description will be given of a configuration of a control system in the 0th-order process system (information acquisition system) 3 according to the embodiment.

FIG. 4 is a block diagram illustrating a configuration example of the control system of the 0th-order process system 3 according to the embodiment.

As illustrated in FIG. 4, the 0th-order process system 3 is configured such that the respective devices (conveyor 22, tag reader 23, camera 24, X-ray photography apparatus 25, form reader 26, and operation terminal 27) are connected to the information acquisition apparatus (0th-order process apparatus) 20.

The information acquisition apparatus 20 acquires various kinds of information from the parcel M that is the inspection target. The information acquisition apparatus 20 acquires the external appearance image, X-ray image, form information and tag information. The information acquisition apparatus 20 registers the acquired information in the database which the upper-level apparatus 2 manages. The information acquisition apparatus 20 is composed of an apparatus, such as a personal computer (PC), which can execute communication of data, processing of data, and storage of data.

As illustrated in FIG. 4, the information acquisition apparatus 20 includes a processor 31, a memory 32, an upper-level communication interface 33 and a communication interface 34.

The processor 31 executes an arithmetic process. The processor 31 is, for example, a CPU. The processor 31 implements various processes by executing programs.

The memory 32 is a storage device which stores programs and data. The memory 32 includes, for example, a ROM that is a read-only nonvolatile memory, a RAM that temporarily stores data, and a rewritable nonvolatile memory.

The processor 31 functions as a processing unit which executes various processes by executing, with use of the RAM, the programs stored in the ROM or nonvolatile memory of the memory 32.

In addition, the memory 32 includes a dictionary DB 32a which stores dictionary data that is used for OCR by the form reader 26. The dictionary data stored in the dictionary DB 32a can be updated in accordance with an operational implementation. For example, the dictionary data may be updated by information in the data acquired from a storage medium or from the outside via a network, or may be updated based on information registered in the second database 16.

Specifically, the dictionary data stored in the dictionary DB 32a may be updated by a difference from the information stored in the external memory connected to the memory I/F 29. In this case, the external memory connected to the memory I/F 29 may store not only the data used as a dictionary for ordinary character recognition, but also information (information of a black list) such as specific sender information or destination information, a parcel of which is to be determined to be NG or to require an inspection. Note that the information of the black list or the like is stored in the storage 14 of the upper-level apparatus 2 as black list data that is used not only for the update of the dictionary data used for OCR, but also for the inspection.

Besides, the dictionary data may be updated by a difference from the information acquired via a network that is communicable by the communication interface.

Furthermore, the dictionary data may be updated by the information stored in the second database 16 of the upper-level apparatus 2. For example, the dictionary data may be updated by the sender information, destination information or the like included in the tag information registered in the second database 16. Moreover, the dictionary data may be updated based on the information relating to a parcel which was determined to be NG by an inspection (secondary inspection) that will be described later. Thereby, the dictionary data enables precise recognition of a form including information similar to the information of a parcel which was determined to be NG in the past. Besides, the updating of the dictionary data, based on the information relating to the parcel that was determined to be NG, not merely enhances the recognition precision with the addition of new data, but also enables precise recognition of a parcel similar to the parcel that was determined to be NG. Thereby, such an advantageous effect is obtained that a parcel similar to the parcel determined to be NG can surely be detected.

The upper-level communication interface 33 is an interface for communicating with the upper-level apparatus (information management apparatus) 2. The processor 31 accesses the second database 16 provided in the upper-level apparatus 2 via the upper-level communication interface 33.

The upper-level communication interface 33 is also an interface for accessing the database. In addition, the upper-level communication interface 33 may be configured to have a function of communicably connecting to a primary inspection apparatus 50 of the primary inspection system 4 and a secondary inspection apparatus 50 of the secondary inspection system 5.

The communication interface 34 is an interface for communicating with the respective devices in the 0th-order process system 3. The communication interface 34 includes a terminal and a circuit, which support a communication standard or the like for communicating with the respective devices in the 0th-order process system 3. For example, the communication interface 34 includes an interface for the processor 31 to communicate with the tag reader 23, camera 24, X-ray photography apparatus 25, form reader 26 and operation terminal 27.

Next, a configuration of the operation terminal 27 will be described.

As illustrated in FIG. 4, the operation terminal 27 includes a processor 41, a memory 42, a communication interface 43, a touch panel 28, and a memory I/F 29.

The processor 41 executes an arithmetic process. The processor 41 is, for example, a CPU. The processor 41 implements various processes by executing programs.

The memory 42 is a storage device which stores programs and data. The memory 42 includes, for example, ROM that is a read-only nonvolatile memory, a RAM that temporarily stores data, and a rewritable nonvolatile memory.

The processor 41 functions as a processing unit which executes various processes by executing, with use of the RAM, the programs stored in the ROM or nonvolatile memory of the memory 42.

The communication interface 43 is an interface for communicating with the information acquisition apparatus (0th-order process apparatus) 20. The communication interface 43 may be configured to communicate with other devices in the 0th-order process system 3.

The touch panel 28 is an example of a user interface which executes display of a screen, and generation of an operation signal corresponding to the operator's operation. The touch panel 28 includes a display 45 and a touch sensor 46 which are constructed as one body. However, the operation terminal 27 may be configured to include, as a user interface, an operation device that generates an operation signal corresponding to an operation, in addition to the touch panel 28. The operation device may be any of such devices as a mouse, a trackball, a keyboard, a trackpad, and the like.

The display 45 displays, on the screen, data (screen data) for display, which is supplied from the processor 41 or a graphic controller (not shown). The touch sensor 46 generates an operation signal indicative of a position which is touched by the operator, who operates the operation terminal 27, on the screen displayed on the display 45. Thereby, the touch panel 28 functions as a user interface which detects, by the touch sensor 46, an input to an icon that functions as an operation key displayed on the display 45.

The memory I/F 29 connects to an external memory device. The memory I/F 29 is a device which executes an input/output of data from/to the external memory device. For example, the memory I/F 29 reads data from an external memory device that is set by the operator. The memory I/F 29 supplies the information, which is read from the external memory device, to the processor 41 of the operation terminal 27. The processor 41 supplies to the information acquisition apparatus 20 the information which is read from the external memory device by the memory I/F 29. The information acquisition apparatus 20 may further supply to the upper-level apparatus 2 the information which is read from the external memory device by the memory I/F 29.

Next, a description will be given of a configuration of the primary inspection system 4 and secondary inspection system 5 according to the embodiment.

Figure 5:
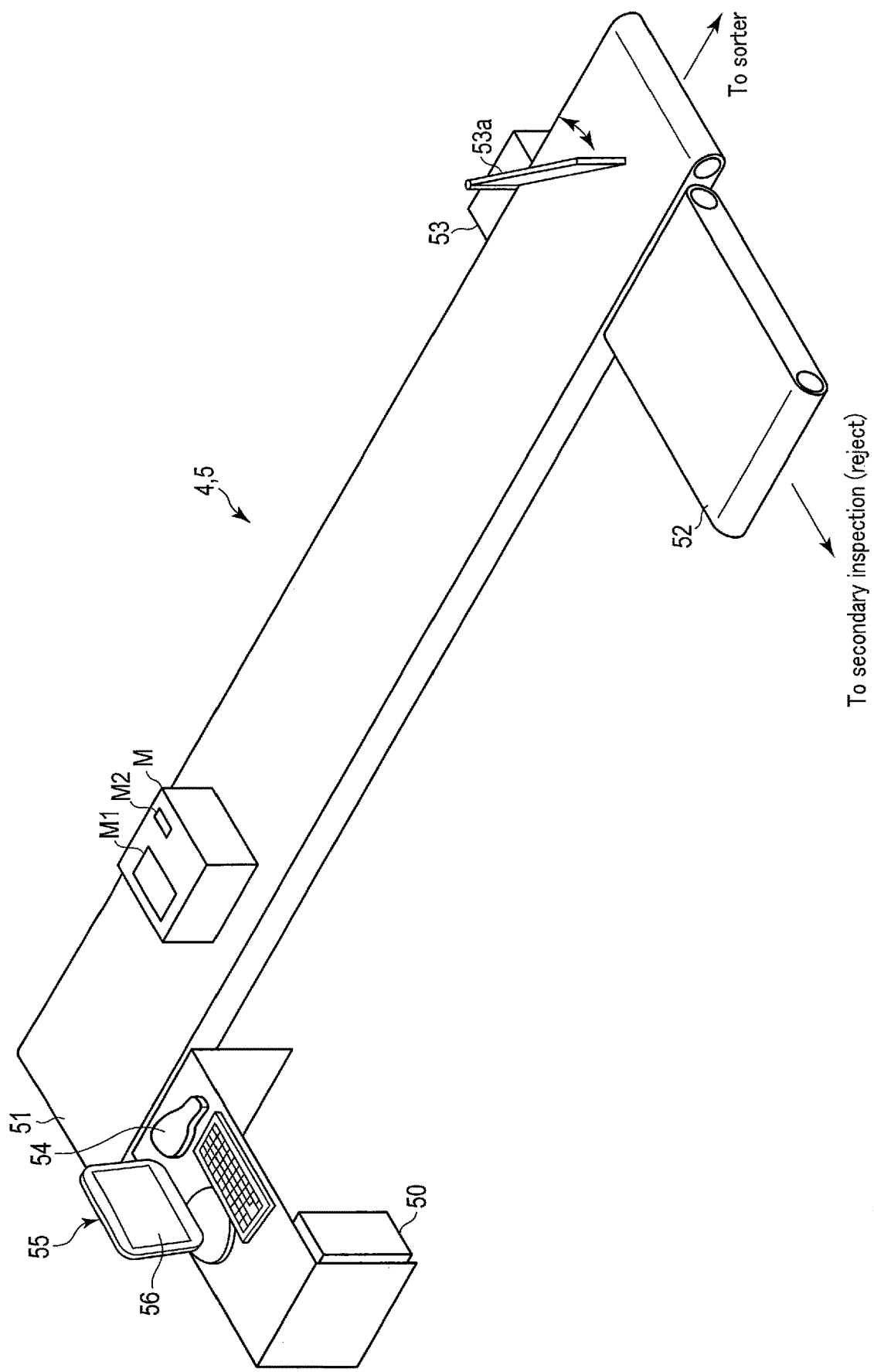
FIG. 5 is a view illustrating a configuration example of a primary inspection system and a secondary inspection system in the inspection system according to the embodiment.

FIG. 5 is a view illustrating a configuration example of the primary inspection system 4 and secondary inspection system 5 according to the embodiment.

Note that, in the present embodiment, the description is given on the assumption that the primary inspection system 4 and the secondary inspection system 5 include a similar configuration as illustrated in FIG. 5. However, actually, the primary inspection system 4 and the secondary inspection system 5 are different systems, and the primary inspection system 4 is installed on a primary inspection site, and the secondary inspection system 5 is installed on a secondary inspection site that is different from the primary inspection site. Thus, the primary inspection system 4 and the secondary inspection system 5 may include different configurations. For example, in the secondary inspection system 5, as will be described later, a space for performing work for unpacking and inspection may be secured for the operator to unpack and inspect the parcel M.

The primary inspection system 4 (secondary inspection system 5) includes an inspection apparatus (primary inspection apparatus, secondary inspection apparatus) 50, a first conveyor 51, a second conveyor 52, a distribution mechanism 53, a form reader 54, and an operation terminal 55. The inspection apparatus 50 is configured to be communicable with the first conveyor 51, second conveyor 52, distribution mechanism 53, form reader 54 and operation terminal 55.

The first conveyor 51 conveys the parcel M that is the inspection target in a first direction. The parcel M, which is the inspection target of the inspection system 1, is the parcel, the information of which was read by the 0th-order process system 3 as illustrated in FIG. 3. The first conveyor 51 repeatedly conveys and stops the parcel M in accordance with the control of the inspection apparatus 50. The operation of the first conveyor 51 is controlled to enable the operator to easily perform the work of inspection or the like of the parcel M placed on the first conveyor 51. For example, such an operational implementation is performed that in the state in which the conveyance of the parcel M by the first conveyor 51 is stopped, the work of inspection or the like by the operator is conducted for the parcel M placed on the first conveyor 51. In addition, the parcel M, of which the inspection result was determined to be OK (for example, a deliverable normal parcel), is sent to a rear end portion of the first conveyor 51. A mechanism, which guides the parcel M that was determined to be normal to a sorting apparatus (sorter) that sorts the parcel M according to the address, may be provided on the rear end portion of the first conveyor 51.

In addition, a gate 53a, which is driven by the distribution mechanism 53, is provided on the conveyance path of the parcel M by the first conveyor 51. The distribution mechanism 53 rotates the gate 53a and performs distribution (sorting) as to whether the parcel M that was conveyed by the first conveyor 51 is to be conveyed by the first conveyor 51 as such, or is to be conveyed by the second conveyor 52. When the parcel M is distributed to the second conveyor 52, the gate 53a is set in such a position as to guide the parcel M, which is conveyed by the first conveyor 51, to the second conveyor 52. In addition, when the parcel M is to be conveyed by the first conveyor 51 as such, the gate 53a is set in such a position as not to interfere with the parcel M conveyed by the first conveyor 51.

The second conveyor 52 conveys the parcel M in a second direction, the parcel M being distributed from the first conveyor 51 by the gate 53a. The parcel M, of which the inspection result was determined to be NG (the secondary inspection is necessary, or the parcel M is to be rejected), is sent to a rear end portion of the second conveyor 52. A mechanism for sending the parcel M to the secondary inspection system 5 or a reject accumulation unit may be provided on the rear end portion of the second conveyor 52. For example, a mechanism for sending the parcel M to the secondary inspection system 5 may be provided on the rear end portion of the second conveyor 52 of the primary inspection system 4. In addition, a mechanism for sending the parcel M to the reject accumulation unit, which accumulates rejected parcels, may be provided on the rear end portion of the second conveyor 52 of the secondary inspection system 5.

The distribution mechanism 53 drives the gate 53a and distributes the parcel M that is conveyed by the first conveyor 51. The gate 53a is disposed on the first conveyor 51 on the downstream side of the position where the inspection work for the parcel M is conducted. For example, when the inspection result of the parcel M conveyed by the first conveyor 51 is OK, the distribution mechanism 53 drives the gate 53a such that the parcel M is conveyed by the first conveyor 51 as such. In addition, when the inspection result of the parcel M conveyed by the first conveyor 51 is NG (the secondary inspection is necessary, or the parcel M is to be rejected), the distribution mechanism 53 drives the gate 53a such that the parcel M is guided to the second conveyor 52.

Furthermore, the distribution mechanism 53 may be configured as a retention mechanism that retains the parcel M, which is conveyed by the first conveyor 51, by the gate 53a. For example, the distribution mechanism 53 moves the gate 53a to such a position as to hold back the parcel M that is conveyed by the first conveyor 51, thereby staying the parcel M on the first conveyor 51. Thereby, when a plurality of parcels (parcels of a multiple-item group), which form one set, are processed, the distribution mechanism 53 can retain a parcel, which was inspected earlier, on the first conveyor 51 by the gate 53a. Specifically, by retaining each parcel of the multiple-item group by the distribution mechanism 53, the inspection apparatus 50 can execute control to distribute the parcels of the multiple-item group together in the same direction, based on a comprehensive determination result (a result of multiple-item determination) for the parcels of the multiple-item group.

Note that the mechanism that retains the parcel conveyed by the first conveyor 51 is not limited to a mechanism realized by the driving of the gate 53a. The mechanism that retains the parcel may be any mechanism which retains each parcel such that the parcels of the multiple-item group can be conveyed together to the same destination of distribution.

The form reader 54 is configured to read identification information from the form M1 or tag M2 attached to the parcel M on the first conveyor 51. The form reader 54 may be a handy scanner which is held by the hand of the operator to perform scanning, or may be a form reader which is disposed in a fixed position and reads identification information from the form M1 or tag M2 attached to the parcel M conveyed by the first conveyor 51.

The operation terminal 55 generates a signal (operation signal) corresponding to an operation input of the operator, and supplies the operation signal to the inspection apparatus 50. The operation terminal 55 includes a touch panel 56 that includes a display and a touch sensor. The operation terminal 55 may be configured to key-input the identification information of the parcel M to be inspected, by the operator using the touch sensor of the touch panel 56. Note that the operation terminal 55 may be configured to function as the search terminal 6 which executes an input of a search key and executes display of information as a search result, as will be described later.

The operation terminal 55 displays, on the display of the touch panel 56, the information relating to the parcel M of the identification information read by the form reader 54 or the identification information input by the key-input. The operation terminal 55 displays on the display the information (external appearance image, X-ray image, form information, and tag information) acquired from the parcel M in the 0th-order process system 3. In the primary inspection system 4, the operator performs an inspection for determining whether the parcel M is normal, based on the information displayed on the display of the touch panel 56. In the case of the inspection result that the parcel M is normal (OK), the operator gives an instruction that the parcel M is deliverable, by using the touch panel. In the case of the inspection result that the parcel M is not normal (NG), the operator gives an instruction that the parcel M requires the secondary inspection or the parcel M is to be rejected, by using the touch panel.

Next, a description will be given of a configuration of a control system in the primary inspection system 4 or secondary inspection system 5 according to the embodiment.

Figure 6:
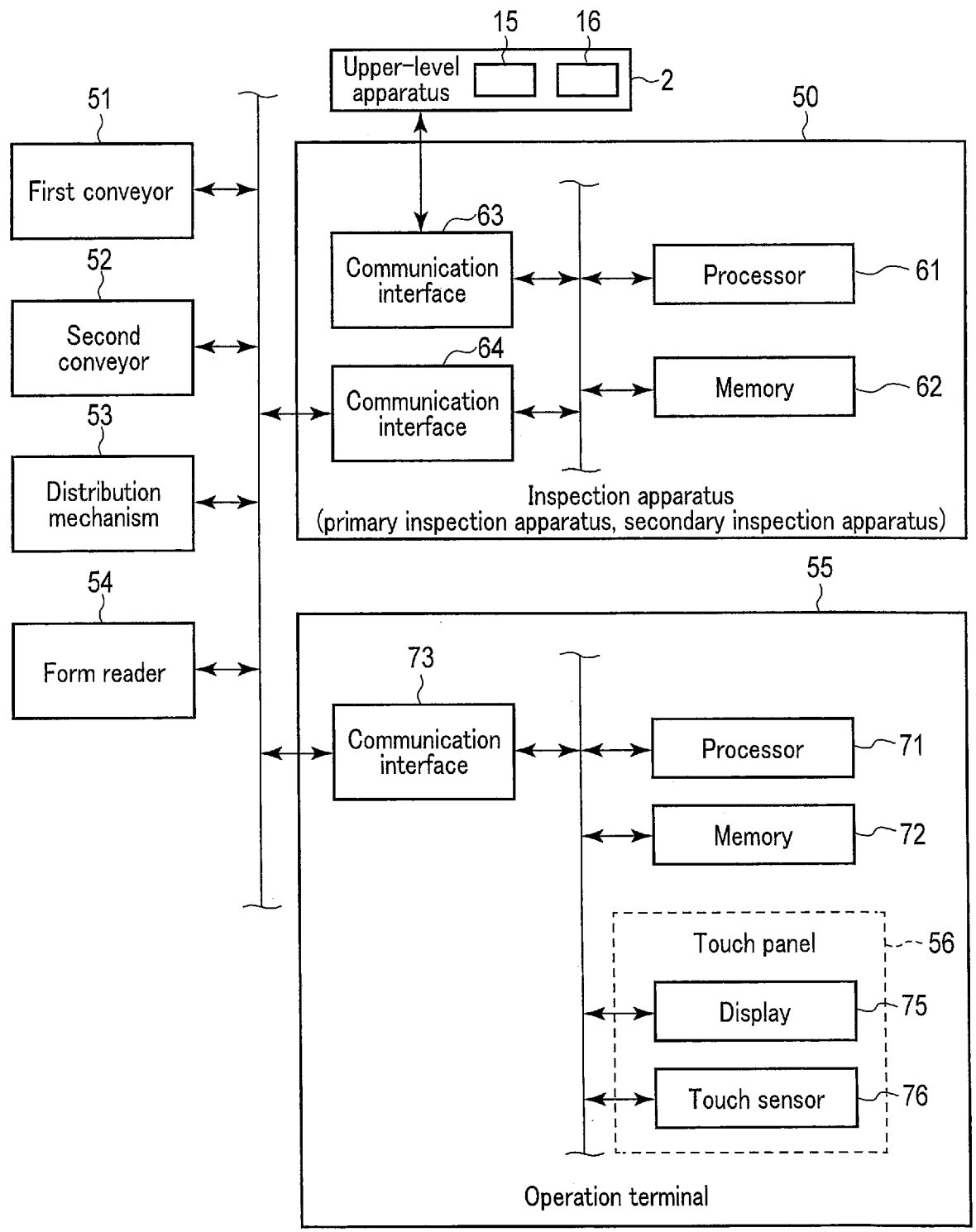
FIG. 6 is a block diagram illustrating a configuration example of a control system of the primary inspection system and the secondary inspection system in the inspection system according to the embodiment.

FIG. 6 is a block diagram illustrating a configuration example of the control system in the primary inspection system 4 or secondary inspection system 5 according to the embodiment.

As illustrated in FIG. 6, the primary inspection system 4 (secondary inspection system 5) is configured such that the respective devices (first conveyor 51, second conveyor 52, distribution mechanism 53, form reader 54, and operation terminal 55) are connected to the inspection apparatus (primary inspection apparatus, secondary inspection apparatus) 50.

The inspection apparatus 50 is composed of an apparatus, such as a personal computer (PC), which can execute communication of data, processing of data, and storage of data. The inspection apparatus 50 causes the operation terminal 55 to display the information (external appearance image, X-ray image, form information and tag information) of the parcel M to be inspected, and acquires an inspection result which the operator inputs by the operation terminal 55. In accordance with the inspection work and the inspection result, the inspection apparatus 50 controls the driving of the first conveyor 51, second conveyor 52 and distribution mechanism 53. The inspection apparatus 50 acquires from the upper-level apparatus 2 the information of the parcel M corresponding to the identification information (parcel ID) read by the form reader 54, or the identification information which the operator key-inputs by operation terminal 55, and supplies the information of the parcel M, which is acquired from the upper-level apparatus 2, to the operation terminal 55.

As illustrated in FIG. 6, the inspection apparatus 50 includes a processor 61, a memory 62, an upper-level communication interface 63 and a communication interface 64.

The processor 61 executes an arithmetic process. The processor 61 is, for example, a CPU. The processor 61 implements various processes by executing programs.

The memory 62 is a storage device which stores programs and data. The memory 62 includes, for example, a ROM that is a read-only nonvolatile memory, a RAM that temporarily stores data, and a rewritable nonvolatile memory.

The processor 61 functions as a processing unit which executes various processes by executing, with use of the RAM, the programs stored in the ROM or nonvolatile memory of the memory 62.

The upper-level communication interface 63 is an interface for communicating with the upper-level apparatus (information management apparatus) 2. The processor 61 accesses the second database 16 provided in the upper-level apparatus 2 via the upper-level communication interface 63. The upper-level communication interface 63 is also an interface for the inspection apparatus 50 to access the database. The upper-level communication interface 63 may be configured to have a function of communicating with the information acquisition apparatus 20 of the 0th-order process system 3, and the like.

The communication interface 64 is an interface for communicating with the respective devices in the primary inspection system 4 (secondary inspection apparatus 5). The communication interface 64 includes a terminal and a circuit, which support a communication standard or the like for communicating with the respective devices.

Next, a configuration of the operation terminal 55 will be described.

As illustrated in FIG. 6, the operation terminal 55 includes a processor 71, a memory 72, a communication interface 73 and a touch panel 56.

The processor 71 executes an arithmetic process. The processor 71 is, for example, a CPU. The processor 71 implements various processes by executing programs.

The memory 72 is a storage device which stores programs and data. The memory 72 includes, for example, a ROM that is a read-only nonvolatile memory, a RAM that temporarily stores data, and a rewritable nonvolatile memory.

The processor 71 functions as a processing unit which executes various processes by executing, with use of the RAM, the programs stored in the ROM or nonvolatile memory of the memory 72.

The communication interface 73 is an interface for communicating with the inspection apparatus 50. The communication interface 73 may be configured to communicate with other devices in the primary inspection system 4 (secondary inspection system 5).

The touch panel 56 is an example of a user interface which executes display of a screen, and generation of an operation signal corresponding to the operator's operation. The touch panel 56 includes a display 75 and a touch sensor 76 which are constructed as one body. However, the operation terminal 55 may be configured to include, as a user interface, a display which displays a screen, and an operation device that generates an operation signal corresponding to an operation. The operation device may be a mouse, a trackball, a keyboard, a trackpad, or the like.

The display 75 displays, on the screen, data (screen data) for display, which is supplied from the processor 71 or a graphic controller (not shown). The touch sensor 76 generates an operation signal indicative of a position which is touched by the operator, who operates the operation terminal 55, on the screen displayed on the display 75. Thereby, the touch panel 56 functions as a user interface which detects, by the touch sensor 76, an input to an icon that functions as an operation key displayed on the display 75.

Next, an operation of the inspection system 1 according to the embodiment will be described.

Figure 7:
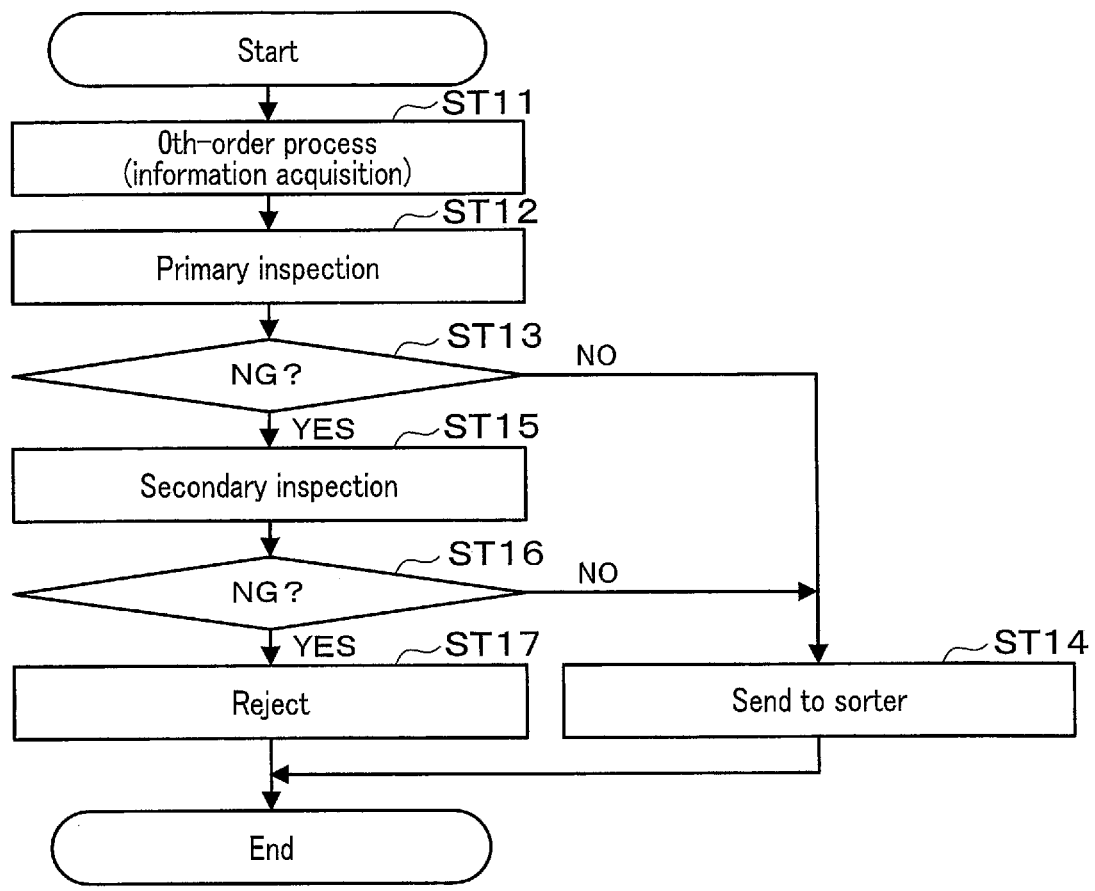
FIG. 7 is a flowchart for schematically describing a flow of an operation of the entirety of the inspection system according to the embodiment.

FIG. 7 is a flowchart for schematically describing the operation of the entirety of the inspection system 1 according to the embodiment.

The inspection system 1 successively executes a 0th-order process (information acquisition process) by the 0th-order process system, a primary inspection process by the primary inspection system, and a secondary inspection process by the secondary inspection system.

The 0th-order process system 2 executes the information acquisition process (0th-order process) of acquiring the external appearance image, X-ray image, form information and tag information from the parcel M of the inspection target (ST11). The 0th-order process system 2 acquires a parcel ID (identification information such as a mail article number) allocated to the parcel of the inspection target placed on the conveyor 22, and correlates, and registers in the second database 16 of the upper-level apparatus 2, the parcel ID, and the information such as the external appearance image, X-ray image, form information and tag information.

However, when the acquisition of the parcel ID failed, the 0th-order process system 2 registers, in the second database 16 of the upper-level apparatus 2, the various kinds of information acquired from the parcel M, such as the external appearance image, X-ray image, form information and tag information, by correlating them with provisional identification information (provisional ID). In this case, the upper-level apparatus 2 registers the various kinds of information, which are correlated with the provisional identification information (provisional ID), as a data set with no parcel ID in the second database 16. It is assumed that the data set with no parcel ID is registered such that the data set with no parcel ID can be searched as parcel ID acquisition failure data.

The parcel M, for which the 0th-order process was executed, is sent to the primary inspection system 4 installed on the primary inspection site. The primary inspection system 4 provides the information for the operator to perform an inspection (primary inspection) for the parcel of the parcel ID that is input, and performs the primary inspection for acquiring the inspection result (primary inspection result) by the operator (ST12). In the primary inspection process, the external appearance image, X-ray image, form information, tag information and the like of the parcel corresponding to the parcel ID that is input are displayed on the touch panel 56. The operator visually recognizes the displayed information, determines (inspects) whether the secondary inspection is necessary, and inputs the inspection result to the touch panel 56. For example, when the parcel is suspected to include a controlled item, the operator determines that the parcel requires the secondary inspection.

When it is determined that the secondary inspection is not necessary (normal, OK) (ST13, NO), the primary inspection system 4 finishes the inspection for the parcel, and determines that the destination of distribution of the parcel is the address sorting apparatus (sorter) (ST14). In addition, when it is determined that the secondary inspection is necessary (NG) (ST13, YES), the primary inspection system 4 determines that the destination of distribution of the parcel is the secondary inspection system installed on the secondary inspection site.

Here, when the input parcel ID is absent in the second database 16, the primary inspection system 4 acquires a list of data sets with no parcel ID as the parcel ID acquisition failure data. In this case, the primary inspection system 4 displays, on the touch panel 56, the list of data sets with no parcel ID, displays a data set, which is selected from the list by the operator, as a data set of the parcel of the inspection target, and executes the inspection by the operator. In addition, the parcel ID that is input to the data set selected by the operator is registered in the second database 16.

The parcel, which was determined to require the secondary inspection by the primary inspection, is sent to the secondary inspection system 5 installed on the secondary inspection site. The secondary inspection system 5 executes the secondary inspection process in which the operator unpacks the parcel that is the inspection target, and performs a detailed inspection (secondary inspection) (ST15). In the secondary inspection process, the operator unpacks the parcel and inspects the content of the parcel. For example, when it is confirmed that a controlled item is included in the parcel, the operator determines that the parcel is abnormal (NG). The operator inputs a result of the inspection (secondary inspection) through the touch panel 56. Here, when the operator determined that the parcel is abnormal, the operator may input through the touch panel 56 the reason for the determination that the parcel is abnormal (a controlled item, a dangerous article, abnormality in regard to the sender, abnormality in regard to the receiver, a taxable item, or the like).

The secondary inspection system determines whether the parcel of the inspection target is abnormal or normal, in accordance with the input to the touch panel 56 by the operator (ST16). When the input indicating that the parcel is abnormal (NG) is made to the touch panel 56 (ST16, YES), the secondary inspection system 5 determines that the destination of distribution of the parcel is the reject (ST17). On the other hand, when the input indicating that the parcel is normal is made to the touch panel 56 (ST16, NO), the secondary inspection system 5 determines that the destination of distribution of the parcel is the address sorting apparatus (sorter) which sorts the parcel according to the destination address (ST14).

Next, a detailed description will be given of the above-described information acquisition process (0th-order process) by the 0th-order process system 3.

Figure 8:
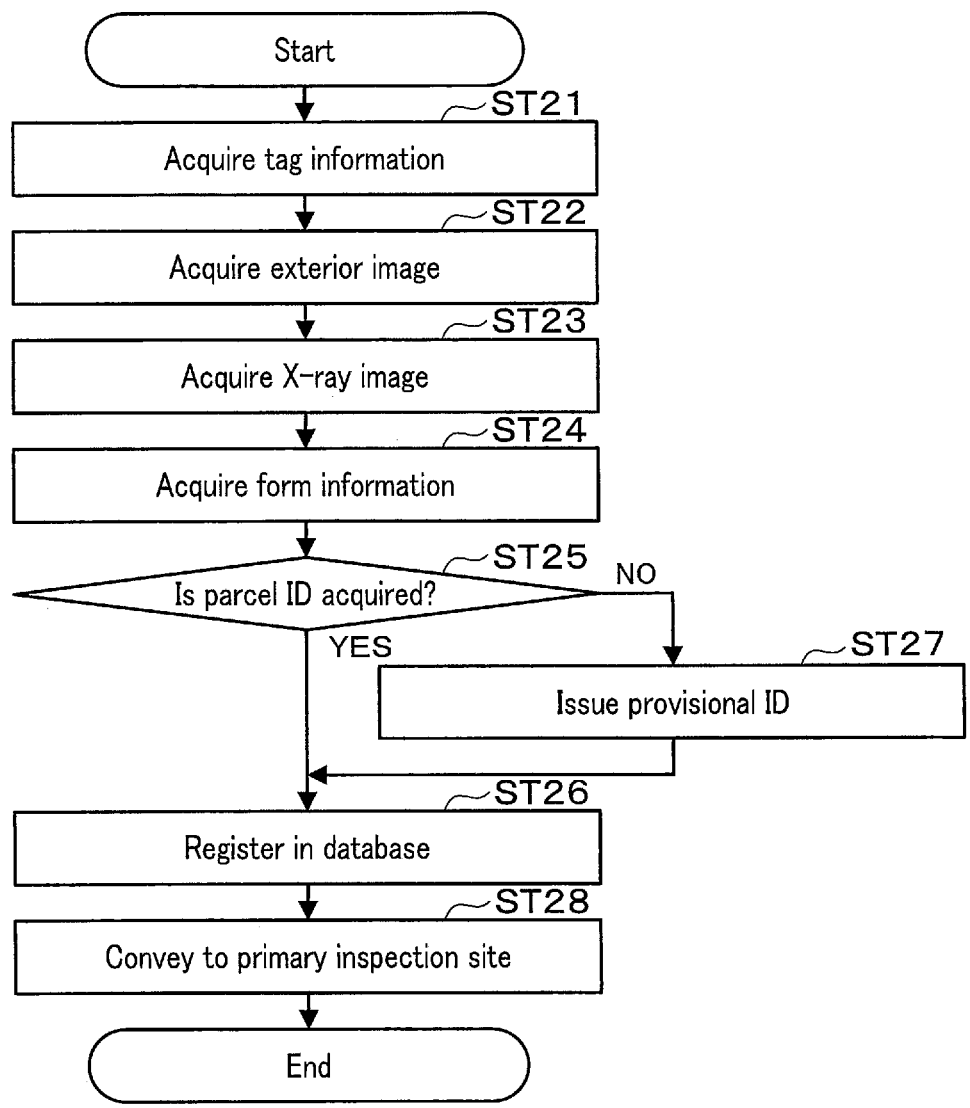
FIG. 8 is a flowchart for describing an operation example of an information acquisition (0th-order process) system in the inspection system according to the embodiment.

FIG. 8 is a flowchart for describing an example of the information acquisition process by the 0th-order process system 3.

In the 0th-order process system 3, the parcel M of the inspection target is placed on the conveyor 22 in such a direction that the form M1 and tag M2 can be read by the tag reader 23, camera 24 and form reader 26. The processor 31 causes the conveyor 22 to successively convey the respective parcels M, and successively acquires information from the tag reader 23, camera 24, X-ray photography apparatus 25 and form reader 26.

The tag reader 23 of the 0th-order process system 3 reads tag information from the tag M2 attached to the parcel M that is being conveyed by the conveyor 22. The tag reader 23 supplies to the information acquisition apparatus 20 the read tag information, or information indicating that the tag could not be read. Thereby, the information acquisition apparatus 20 acquires the tag information of the parcel M, which is supplied from the tag reader 23 via the communication interface 34 (ST21).

The camera 24 of the 0th-order process system 3 photographs the parcel M which is being conveyed by the conveyor 22. The camera 24 supplies the image, which is captured by photographing the parcel M on the conveyor 22, to the information acquisition apparatus 20 as the external appearance image. Thereby, the information acquisition apparatus 20 acquires the external appearance image of the parcel M, which is supplied from the camera 24 via the communication interface 34 (ST22).

The X-ray photography apparatus 25 of the 0th-order process system 3 captures an X-ray image of the parcel M which is being conveyed by the conveyor 22. The X-ray photography apparatus 25 supplies the image, which is captured by radiating X-rays to the parcel M on the conveyor 22, to the information acquisition apparatus 20 as the X-ray image. Thereby, the information acquisition apparatus 20 acquires the X-ray image, which is supplied from the X-ray photography apparatus 25 via the communication interface 34 (ST23).

The form reader 26 of the 0th-order process system 3 reads the form information from the form M1 attached to the parcel M which is being conveyed by the conveyor 22. The form reader 26 recognizes the form information described on the form M1 by an OCR process using the dictionary of the dictionary DB 32a, and supplies the form information, which is acquired as the recognition result, to the information acquisition apparatus 20. Thereby, the information acquisition apparatus 20 acquires the form information described on the form M1 attached to the parcel, which is supplied from the form reader 26 via the communication interface 34 (ST24).

The processor 31 of the information acquisition 20 confirms whether the parcel ID of the parcel, the various kinds of information of which were acquired, could be acquired (ST25). For example, the processor 31 confirms whether the parcel ID could be acquired, based on whether the tag information including the identification information that is the parcel ID could be read from the parcel M by the tag reader 23.

In addition, when the parcel ID could be acquired (ST25, YES), the processor 31 registers a data set, in which the various kinds of information (external appearance image, X-ray image, form information and the like) acquired from the parcel M are correlated with the parcel ID, as the information of the parcel in the second database 16 of the upper-level apparatus 2 (ST26).

Upon receiving the dataset including the parcel ID from the primary inspection system 4, the upper-level apparatus 2 registers in the second database 16 the various kinds of information that was acquired by being correlated with the parcel ID.

In addition, when the acquisition of the parcel ID failed (ST25, NO), the processor 31 issues provisional identification information (provisional ID) for the parcel, the various kinds of information of which were acquired (ST27). Upon issuing the provisional ID, the processor 31 registers a data set, in which the various kinds of information (external appearance image, X-ray image, form information and the like) acquired from the parcel M are combined with the provisional ID, as the information of the parcel in the second database 16 of the upper-level apparatus 2 (ST26).

Upon receiving the data set including the provisional ID from the primary inspection system 3, the upper-level apparatus 2 registers the various kinds of information acquired from the parcel with no parcel ID in the second database 16 as a data set for one parcel. In this case, the second database 16 registers the various kinds of information such that the data set of each parcel registered with no parcel ID can be searched as failure data indicating that the acquisition of the parcel ID failed.

FIG. 9 is a view illustrating an example of the second database 16 in which the information of parcels acquired in the 0th-order process is registered.

FIG. 9 illustrates an example in which, among data sets registered in the second database 16, the information acquired in the 0th-order process is registered. In the data example illustrated in FIG. 9, a receipt number is information that is issued in accordance with a processing date/time, or the like. FIG. 9 illustrates an example in which a date, a time, a work site number, and the like are combined as the receipt number. In addition, the receipt number may also be used as the provisional ID.

A parcel ID, sender information and destination (receiver) information are information acquired from the tag M2 or form M1. The parcel ID, sender information, destination (receiver) information, article name and "others" information, which are illustrated in FIG. 9, may be advance data such as tag information.

In the present embodiment, in the 0th-order process system, it is assumed that the parcel ID is included in the tag information that is read from the tag M2 by the tag reader 23. Thus, when the tag reader 23 failed to read the tag information including the parcel ID, it is assumed that the acquisition of the parcel ID failed. In addition, the sender information and the destination information may be used in order to update the dictionary DB 32a as the dictionary data of OCR. Besides, the article name is information indicative of an article that is the content of the parcel. The "others" information is information or the like, which is acquired by OCR-processing characters described on the article content application form included in the form M1.

The X-ray image is an image which the X-ray photography apparatus 25 captures by using X-rays. The X-ray image may be not only an image in one direction, but also a plurality of X-ray images captured along a plurality of axes. The external appearance image is an image captured by the camera 24. As the external appearance image, a plurality of image data of different data formats may be registered. In addition, the X-ray image and external appearance image may be registered in the second database 16, not only with the addition of file names but also with the addition of storage paths.

In addition, the processor 31 of the information acquisition apparatus 20 registers the various kinds of information of the parcels of the multiple-item group in the second database 16, conveys the parcels of the multiple-item group by the conveyor 22, and sends the parcels of the multiple-item group to the primary inspection site where the primary inspection system 4 is installed (ST28). The parcels processed by the 0th-order process system 3 may be sent to the primary inspection system 4 from the conveyor 22, or may be conveyed to the primary inspection system 4 by other convey means (for example, AGV) from the rear end on the downstream side of the conveyor 22.

Next, a detailed description will be given of the primary inspection process by the primary process system 4.

Figure 10:
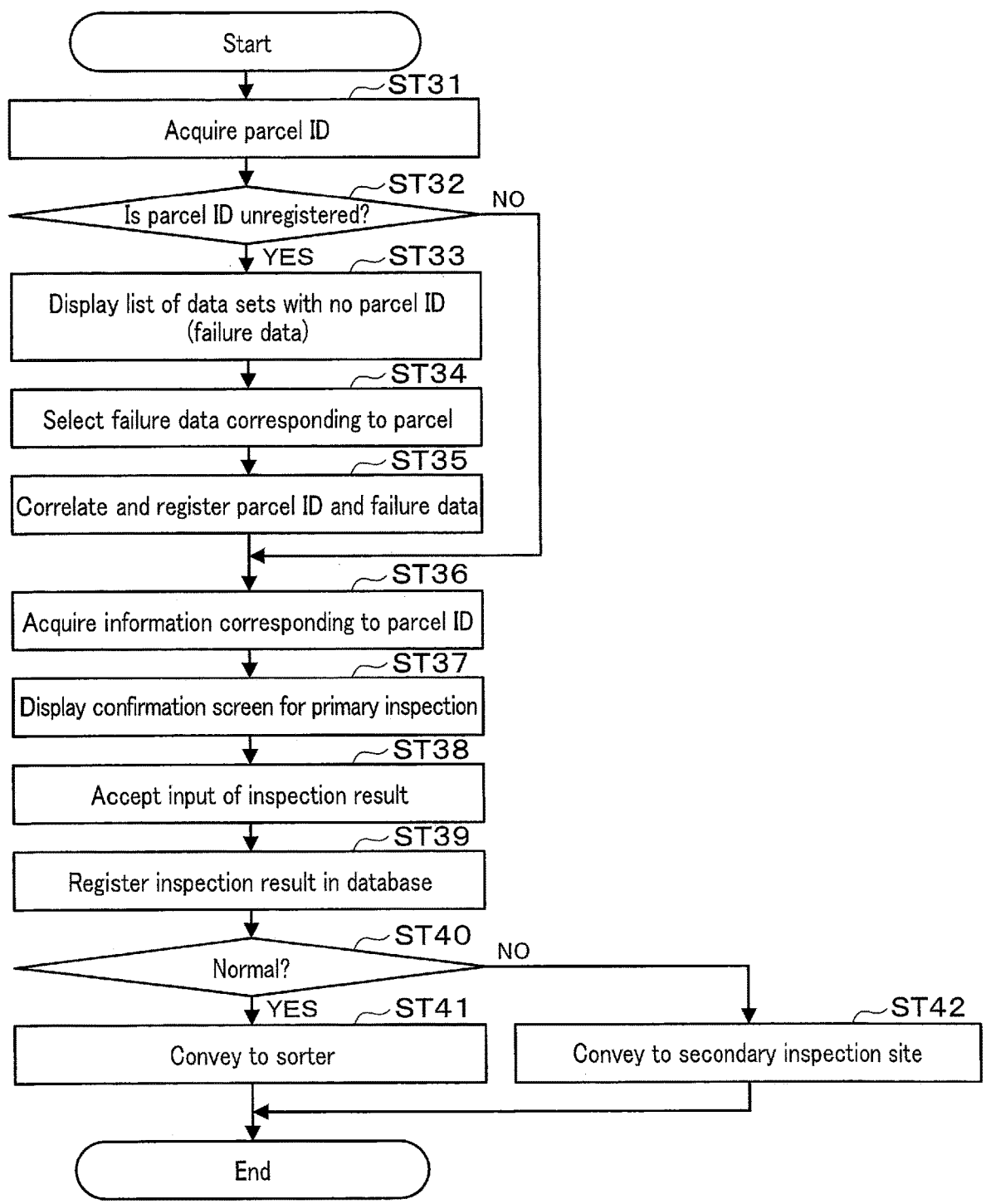
FIG. 10 is a flowchart for describing an example of a primary inspection process by the primary inspection system in the inspection system according to the embodiment.

FIG. 10 is a flowchart for describing an example of the primary inspection process for the parcels of the multiple-item group by the primary process system 4.

In the primary inspection system 4, an inspection (primary inspection) is performed for the parcels M, the information of which was registered in the second database 16 by the 0th-order process system. In the primary inspection, the operator views the information acquired from the parcels M by the 0th-order process, thereby determining whether the secondary inspection is necessary.

To start with, in the primary inspection system 4, the parcel M that is the target of the primary inspection is placed on the first conveyor 51, and the parcel ID of the parcel M is input. The form reader 54 inputs the parcel ID of the parcel M by reading the tag M2 or form M1 attached to the parcel M. In addition, the parcel ID may be input by the operator using the touch panel 56 of the operation terminal 55, or the like.

The processor 61 of the inspection apparatus 50 acquires the parcel ID, which was input by the form reader 54 or operation terminal 55, via the communication interface 64 (ST31). Upon acquiring the parcel ID, the processor 61 of the inspection apparatus 50 accesses the upper-level apparatus 2 by the upper-level communication interface 63, and requests information corresponding to the acquired parcel ID registered in the second database 16.

When the parcel. ID is unregistered in the second database 16 (ST32, YES), the processor 61 of the inspection apparatus 50 receives the list of data sets (failure data), which are registered with no parcel ID, from the upper-level apparatus 2. When the parcel ID designated from the inspection apparatus 50 is absent in the second database 16, the processor 11 of the upper-level apparatus 2 supplies to the inspection apparatus 50 the list of data sets (failure data) which are registered with no parcel ID.

Upon receiving the list of failure data, the processor 61 of the inspection apparatus 50 causes the display 75 of the touch panel 56 to display, in a list format for each parcel (data set), the information of each failure data acquired from the upper-level apparatus 2 (ST33). The processor 61 accepts selection of one failure data, which is designated by the operator through the touch sensor 76 in regard to the failure data displayed on the display 75 in the list format (ST34).

FIG. 11 illustrates an example of a display screen 80 which displays a list of failure data, the display screen 80 being displayed on the touch panel 56 in the primary inspection system 4.

According to the example illustrated in FIG. 11, the touch panel 56 display, in a list format for each parcel, the information included in the data sets registered with no parcel ID. The display screen 80 illustrated in FIG. 11 displays, as information of each parcel, a provisional ID, sender information, destination information, an article name, others, and an external image. By touching a display position of failure data including information agreeing with a parcel (a parcel whose parcel ID was acquired) that is actually inspected, the operator executes such selection that the failure data (data set) is the information of the parcel that is inspected.

Note that the information displayed on the display screen 80 of the list of failure data is not limited to the information illustrated in FIG. 11, and may be any information by which the operator can specify the parcel to be inspected. For example, the list of failure data may display, as the information of each parcel, the information such as sender information, destination information or an external appearance image.

After the list of failure data is displayed on the touch panel 56, if the operator selects any one of the failure data, the processor 61 correlates, and registers in the second database 16, the data set that is the selected failure data, and the parcel ID acquired in ST31 (ST35).

On the other hand, after transmitting the list of failure data to the inspection apparatus 50, the processor 11 of the upper-level apparatus 2 acquires information (for example, a provisional ID) indicative of the failure data that was selected from the inspection apparatus 50 as the data set corresponding to the parcel to be inspected. Upon acquiring the information indicative of the failure data corresponding to the parcel to be inspected, the processor 11 correlates the failure data selected by the inspection apparatus 50 with the parcel ID designated from the inspection apparatus 50, and registers the correlated failure data and parcel ID in the second database 16.

Thereby, in the second database 16, various kinds of information, which the 0th-order process system acquired from the parcel, are registered by being correlated with the parcel ID.

In addition, when the information relating to the parcel corresponding to the acquired parcel ID was acquired, or when the information relating to the parcel included in the data set correlated with the parcel ID acquired in accordance with the selection by the operator was acquired, the processor 61 displays, on the touch panel 56, the information (reference information presented to the operator for the primary inspection) relating to the parcel corresponding to the acquired parcel ID (ST36). For example, the processor 61 displays, on the display 75 of the touch panel 56, the X-ray image, external appearance image, form information and the like, as the information (reference information) presented to the operator.

Figure 12:
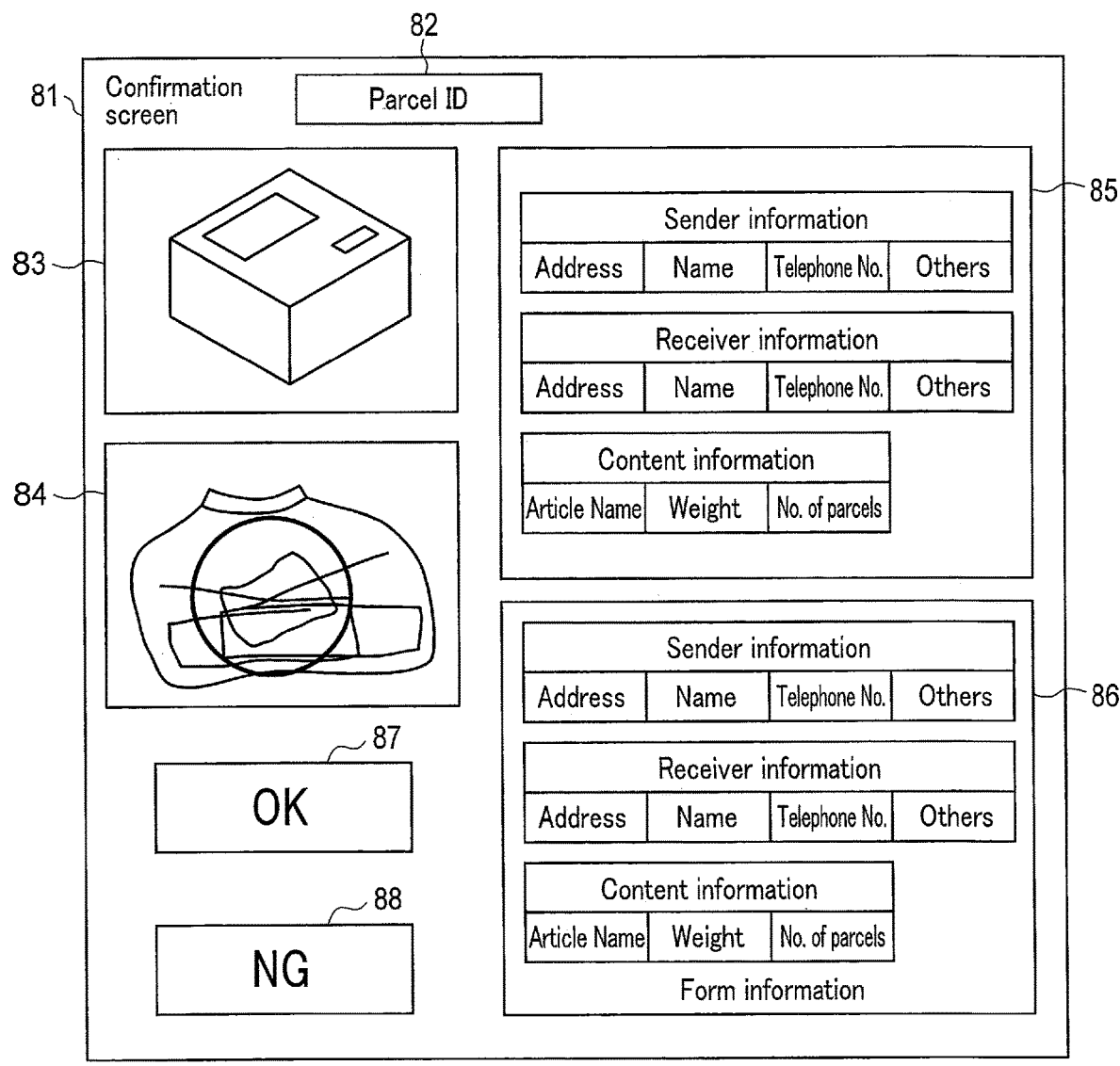
FIG. 12 is a view illustrating an example of a confirmation screen which is displayed for the primary inspection of parcels in the inspection system according to the embodiment.

FIG. 12 is a view illustrating an example of a screen (confirmation screen) 81 which is displayed on the touch panel 56 of the operation terminal 27 in order to present the reference information to the operator.

The confirmation screen 81 displays the information which is used when the operator judges whether the secondary inspection (unpacking and confirmation) is necessary for the parcel. The information displayed on the confirmation screen 81 is reference information that is used as a reference for the operator's judgment. The confirmation screen 81 includes a parcel ID 82, an external appearance image 83, an X-ray image 84, advance data (or tag information) 85, form information 86, an OK button 87, and an NG button 88.

The parcel ID 82 is unique identification information allocated to each parcel.

The external appearance image 83 is an external appearance image of the parcel, which was acquired by the camera 24. The X-ray image 84 is an X-ray image of the parcel M, which was acquired by the X-ray photograph apparatus 25. The X-ray image 84 or the external appearance image 83 may be displayed on a display which is provided separately from the touch panel 56.

The advance data 85 is information which is the tag information acquired by the tag reader 23 recognizing the tag attached to the parcel, or the information registered in the first database 15 in association with the parcel ID. Note that when the tag reader 23 failed to read the tag code, the parcel ID 81 and advance data 85 may be left as blank fields, and the operator may be prompted to input the parcel ID (identification information such as a mail article number).

The form information 86 is form information that was read from the form of the parcel by the form reader 26. In the example of FIG. 12, the advance data 85 and the form information 86 display the information such as the sender information of the parcel, the receiver information of the parcel, and the content information of the article.

The OK button 87 and the NG button 88 are buttons which can be selected by the touch sensor 76. The operator confirms the reference information displayed on the confirmation screen 81, and judges whether the secondary inspection (unpacking and confirmation) is necessary for the parcel M. Specifically, the operator confirms the external appearance image 83, X-ray image 84, advance data 85 and form information 86 displayed on the confirmation screen 81, judges whether the secondary inspection is necessary for the parcel, and selects and inputs one of the OK button 87 or the NG button 88. In other words, the operator inputs the OK button 87 when the operator judges that the secondary inspection is not necessary. In addition, the operator inputs the NG button 88 when the operator judges that the secondary inspection is necessary for the parcel.

After displaying the confirmation screen 81 as the reference information that is presented to the operator, the processor 61 accepts an input of an inspection result by the operator (ST38). The processor 61 registers in the second data base 16 the inspection result that the operator inputs (ST39). For example, if the OK button 87 is input by the operator, the processor 61 determines that the parcel is a normal parcel that does not require the secondary inspection. On the other hand, if the NG button 88 is input by the operator, the processor 61 determines that the parcel is a parcel that requires the secondary inspection.

FIG. 13 illustrates an example in which information, such as a result of the primary inspection, is additionally written in the second database 16 illustrated in FIG. 9. In addition, FIG. 13 illustrates an example in which information, such as a result of the secondary inspection, is also additionally written in the second database 16.

In the example illustrated in FIG. 13, a primary inspection result, a primary inspection content, and a processing date/time are stored as the information relating to the primary inspection. The primary inspection result indicates whether the determination result is "normal" (OK) or "abnormal" (NG). The primary inspection content indicates the reason in the case of the determination result of NG. FIG. 13 exemplarily illustrates "X-ray", "EAD (tag) confirmation", "Dog inspection", and "Application form", as the primary inspection content. "X-ray" indicates that an abnormality was suspected from the X-ray image. "EAD confirmation" indicates that the confirmation of the information of the EAD (tag) was determined to be necessary. "Dog inspection" indicates that an inspection by a dog (a drug sniffing dog) was determined to be necessary. "Application form" indicates that the confirmation of the content of the application form was determined to be necessary.

In addition, FIG. 13 also exemplarily illustrates information relating to the secondary inspection. In the example illustrated in FIG. 13, a secondary inspection result, a secondary inspection content, and a processing date/time are stored as the information relating to the secondary inspection. The secondary inspection result indicates whether the determination result is "normal" (OK) or "abnormal" (NG). The secondary inspection content indicates the reason for the determination of NG. FIG. 13 exemplarily illustrates "Explosive" and "Prohibited article". "Explosive" indicates that it was determined that an explosive is included in the parcel. "Prohibited article" indicates that it was determined that a prohibited article is included in the parcel.

Besides, if an inspection result is input by the operator, the processor 61 determines the destination of distribution of the parcel, in accordance with the inspection result. If the parcel is determined to be a normal parcel that does not require the secondary inspection (ST40, YES), the processor 61 determines that the destination of distribution of the parcel is the sorter that sorts the parcel according to the address, and causes the parcel to be conveyed to the sorter. On the other hand, if the parcel is determined to be a parcel that requires the secondary inspection (ST40, NO), the processor 61 determines that the destination of distribution of the parcel is the secondary inspection system 5, and causes the parcel to be conveyed to the secondary inspection site where the secondary inspection system 5 is disposed (ST42).

As described above, in the inspection apparatus of the primary inspection process system, the primary setting process based on the information acquired from the parcel by the 0th-order process is executed, and the primary inspection result is registered in the second database. In addition, according to the above-described operation, in the inspection apparatus of the primary inspection process system, even with respect to the parcel whose parcel ID was not confirmed in the 0th-order process, the data set designated by the operator can be correlated with the parcel ID, and the correlated data set and parcel ID can be registered in the database.

Next, the secondary inspection process by the secondary process system 5 will be described in detail.

Figure 14:
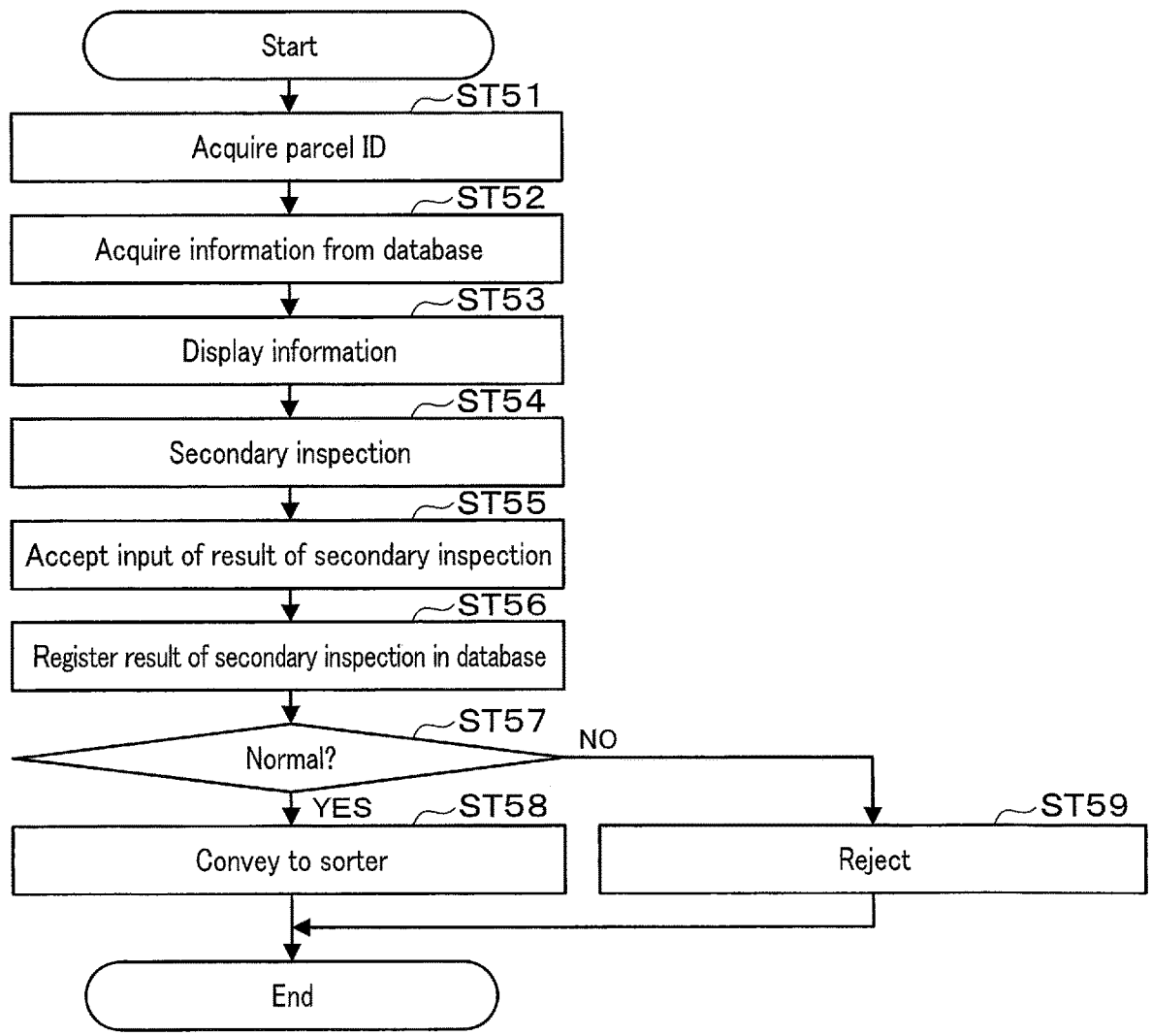
FIG. 14 is a flowchart for describing an operation example of the secondary inspection system in the inspection system according to the embodiment.

FIG. 14 is a flowchart for describing an example of the secondary inspection process by the secondary inspection system 5.

In the secondary inspection system 5, an inspection (secondary inspection) is executed for the parcel for which the secondary inspection is determined to be necessary by the primary process system 4. In the secondary inspection system 5, as the secondary inspection, the operator inspects the content of the parcel in detail by unpacking the parcel.

To start with, in the secondary inspection system 5, the parcel M that is the target of the secondary inspection is placed on the first conveyor 51, and the parcel ID is input. For example, the parcel ID of the parcel M is input by reading the tag M2 or form M1 by the form reader 54. In addition, the parcel ID may be input by the operator using the touch panel 56 of the operation terminal 55, or the like.

The processor 61 of the inspection apparatus 50 of the secondary inspection system 5 acquires the parcel ID, which was input by the form reader 54, via the communication interface 64 (ST51). Upon acquiring the parcel ID, the processor 61 accesses the upper-level apparatus 2 by the upper-level communication interface 63, and acquires from the second database 16 the various kinds of information relating to the parcel corresponding to the parcel ID (ST52). In the second inspection, the processor 61 also acquires the inspection result in the primary inspection from the second database 16.

Upon acquiring the information of the parcel corresponding to the parcel ID, the processor 61 causes the touch panel 56 of the operation terminal 55 to display the information acquired from the second database 16 (the information presented to the operation for the secondary inspection) (ST53). The processor 61 executes display of the inspection result in the primary inspection as the information presented to the operator. In addition, the processor 61 may cause the display 75 of the touch panel 56 to display also the information such as the X-ray image, external appearance image and form information acquired in the 0th-order process, together with the inspection result in the primary inspection.

Furthermore, the processor 61 executes the secondary inspection for the parcel (ST54). In the secondary inspection process, the operator unpacks the parcel and inspects the content of the parcel, and the operator inputs the confirmation result of the content of the unpacked parcel through the touch panel 56 as the inspection result of the secondary inspection. Here, the processor 61 accepts an input of the inspection result by the operator with use of the touch panel 56 (ST55).

If the inspection result is input through the touch panel 56, the processor 61 registers the input inspection result in the second data base 16 (ST56). According to the example illustrated in FIG. 13, in the second database 16, as the information relating to the secondary inspection, the secondary inspection result, secondary inspection content and inspection date/time are registered. In this case, the processor 61 of the inspection apparatus 50 correlates the secondary inspection result, secondary inspection content and inspection date/time with the parcel ID, and supplies them to the upper-level apparatus 2 as the information to be registered in the second database 16. Thereby, the upper-level apparatus 2 registers in the second database 16 the information relating to the secondary inspection from the inspection apparatus 50.

Besides, if the inspection result of the secondary inspection is input, the processor 61 determines the destination of distribution of the parcel, in accordance with the inspection result. If the parcel is determined to be a normal parcel by the secondary inspection (ST57, YES), the processor 61 determines that the destination of distribution of the parcel is the sorter that sorts the parcel according to the address of the parcel, and causes the parcel to be conveyed to the sorter (ST58). On the other hand, if the parcel is determined to have an abnormality by the secondary inspection (ST57, NO), the processor 61 determines that the destination of distribution of the parcel is the reject, and causes the parcel to be conveyed to the reject accumulation unit which accumulates parcels that are determined to be NG (ST59).

As described above, in the inspection apparatus of the secondary inspection process system according to the embodiment, the detailed secondary inspection, in which unpacking or the like is performed, is executed for the parcel that was determined to require the secondary inspection by the primary inspection, and the result of the secondary inspection is registered in the second database.

Next, a process of searching the processing status of a parcel by using the search terminal 6 will be described.

In the present embodiment, the search terminal 6 is used in order to search the processing status, such as the present position of the parcel. In order to search the processing status of a parcel, the search terminal 6 can be implemented by a computer which can communicate with the upper-level apparatus 2 including the database 16 that stores the information relating to parcels. In addition, the search terminal 6 may be any electronic equipment including a user interface such as a touch panel, and a communication interface which can communicate with the upper-level apparatus 2, and the search terminal 6 may be, for example, a mobile terminal that is carried by the operator of the inspection system 1. Besides, the operation terminal 27 in the 0th-order process system 3, or the operation terminal 55 in the primary inspection system 4 or the secondary inspection system 5, may be implemented as the search terminal 6.

The upper-level apparatus 2 searches the data or the like registered in the second database 16 in accordance with the search request from the search terminal 6, and returns a search result to the search terminal 6 that is the source of the search request. In addition, the upper-level apparatus 2 determines the present position of the parcel that was searched in accordance with the search request from the search terminal 6, and provides the information indicative of the present position acquired as the determination result to the search terminal 6 as the search result.

Figure 15:
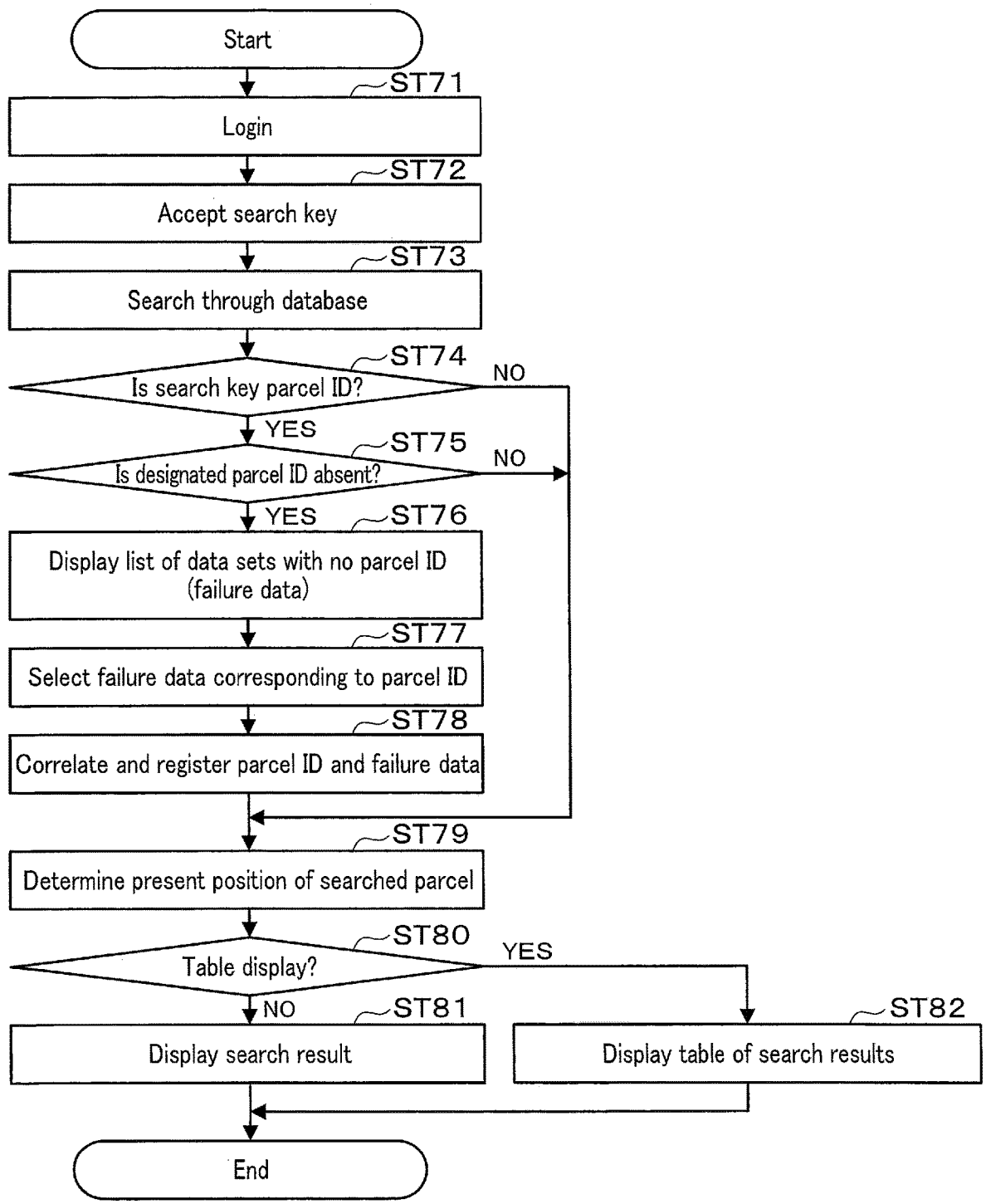
FIG. 15 is a flowchart for describing an operation example of a search process by the upper-level apparatus functioning as an information management apparatus according to the embodiment.

FIG. 15 is a flowchart for describing the search process of searching the processing status of the parcel by the upper-level apparatus 2 functioning as the information management apparatus according to the embodiment.

To start with, the upper-level apparatus 2 executes a user authentication (logon) process in accordance with a request from the search terminal 6 (ST71). For example, the operator inputs authentication information, such as an ID and a password, to the search terminal 6. The search terminal 6 transmits the logon request by the authentication information, which the operator inputs, to the upper-level apparatus 2. The processor 11 of the upper-level apparatus 2 executes user authentication in accordance with the logon request from the search terminal 6 with which the processor 11 of the upper-level apparatus 2 communicates via the communication interface 13.

If the user authentication process is successfully executed, the processor 11 of the upper-level apparatus 2 accepts the search request from the search terminal 6 that requested the logon (ST72). The operator inputs in the search terminal 6 a search key for searching a parcel whose processing status is to be confirmed. The search terminal 6 requests the upper-level apparatus 2 to search the parcel by the search key that was input by the operator.

The search key may be a word registered in the second database 16. For example, when a specific parcel is to be designated, the parcel ID is input as the search key. In addition, the sender or receiver may be used as the search key, or the telephone number or address of the sender or receiver may be used as the search key. Besides, the search key may be designated for an item in the second database 16. For example, when a parcel, which was determined to be NG in the secondary inspection result or the primary inspection result, is to be searched, the search key may be "Secondary inspection, NG", or "Primary inspection, NG".

Upon receiving the search key from the search terminal 6, the processor 11 of the upper-level apparatus 2 searches through the second database 16 by the received search key (ST73). If the search key is a search key for designating one parcel, such as the parcel ID, the processor 11 detects one parcel from the second database 16 as the search result. In addition, if the search key is a word that is common to a plurality of parcels, the processor 11 detects parcels including the search key from the second database 16.

Here, if the search key is a parcel ID (ST74, YES), the processor 11 determines whether the parcel ID designated as the search key is present in the second database 16 (ST75). If the designated parcel ID is unregistered in the second database 16 (ST75, YES), the processor 11 supplies to the search terminal 6 a list of data sets (failure data) which are registered with no parcel ID, and causes the search terminal 6 to display the list of failure data (ST76). For example, the display screen as illustrated in FIG. 11 is displayed on the search terminal 6 as the list of failure data.

For example, the operator touches a display position of any one of failure data on the search terminal 6 that displays the list of failure data, thereby selecting the failure data corresponding to the parcel ID designated as the search key. The search terminal 6 transmits the information indicative of the failure data, which was selected from the list of failure data, to the upper-level apparatus 2.

The processor 11 of the upper-level apparatus 2 selects the failure data, which was selected by the search terminal 6, as the data set searched by the parcel ID that was designated by the search key (ST77). Further, the processor 11 correlates the data set, which is the selected failure data, with the parcel ID designated in ST71, and registers the correlated data set and parcel ID in the second database 16 (ST78). However, in the search process from the search terminal 6, the process (the process of ST78) of correlating and registering the designated parcel ID and the selected failure data may be omitted.

By the above process, if the data set of the parcel searched by the search key is specified, the processor 11 determines the processing status and present position of the parcel from the searched data set (ST79). If a plurality of parcels are searched by the search key, the processor 11 determines the processing status and present position of each of the parcels. The present position of the searched parcel is determined based on the processing status of the primary inspection result and secondary inspection result indicated in the data set of the parcel, which was searched from the second database 16.

FIG. 16 is a view illustrating an example of a table (position search table) for searching the present position of a parcel in accordance with the processing status of the parcel.

The processor 11 determines the present position of each parcel from the data set of each parcel, by referring to the position search table as illustrated in FIG. 16. The position search table as illustrated in FIG. 16 is stored, for example, in the memory 12 or in the nonvolatile memory in the storage 14.

The table illustrated in FIG. 16 is formed such that the processing status and present position of the parcel can be determined based on the combination of the presence/absence of the image data (external appearance image or X-ray image), the primary inspection result, and the secondary inspection result.

For example, when the image data (external appearance image or X-ray image) acquired in the 0th-order process is absent, the processor 11 determines, by referring to the position search table, that the parcel is before being subjected to the 0th-order process and that the present position is the 0th-order inspection site.

In addition, when the image data is present and the primary inspection result and secondary inspection result are unregistered, the processor 11 determines that the parcel is before being subjected to the primary inspection and the present position of the parcel is on the conveyance path between the 0th-order work site and the primary inspection site.

Besides, when the primary inspection result is OK, the processor 11 determines that the inspection of the parcel is completed, and the present position of the parcel is the sorter that performs the sorting process according to the address.

When the primary inspection result is NG and the secondary inspection result is unregistered, the processor 11 determines that the parcel is before being subjected to the secondary inspection, and that the present position of the parcel is on the conveyance path between the primary inspection site and the secondary inspection site.

When the primary inspection result is NG and the secondary inspection result is OK, the processor 11 determines that the inspection of the parcel is completed, and the present position of the parcel is the sorter.

When the primary inspection result is NG and the secondary inspection result is NG, the processor 11 determines that the inspection of the parcel is completed, and the present position of the parcel is the reject.

Upon determining the processing status and present position of the searched parcel, the processor 11 causes the search terminal 6 to display the information of the searched parcel. The processor 11 executes selection as to whether the information of the searched parcel is to be displayed by detailed display or by table display. The selection as to whether the table display is executed may be executed based on the item designated by the search key. For example, when the parcel ID is designated as the search key, the detailed display may be executed, and when a search key other than the parcel ID is designated, the table display may be executed. Furthermore, whether the detailed display or the table display is executed may be designated by the operator. Besides, if a plurality of parcels are searched, the table display may be executed, and if a single parcel is searched, the detailed display may be executed.

If the information of the searched parcel is displayed by the detailed display (ST80, NO), the processor 11 causes the search terminal 6 to display a detailed screen which displays the information of the searched parcel in detail (ST81). For example, the detailed screen is configured to display the information of the searched parcel on a parcel-by-parcel basis, and the search terminal 6 is caused to display the various kinds of information acquired from the parcel in the 0th-order process, the processing status of the parcel, and the information indicative of the present position of the parcel.

Figure 17:
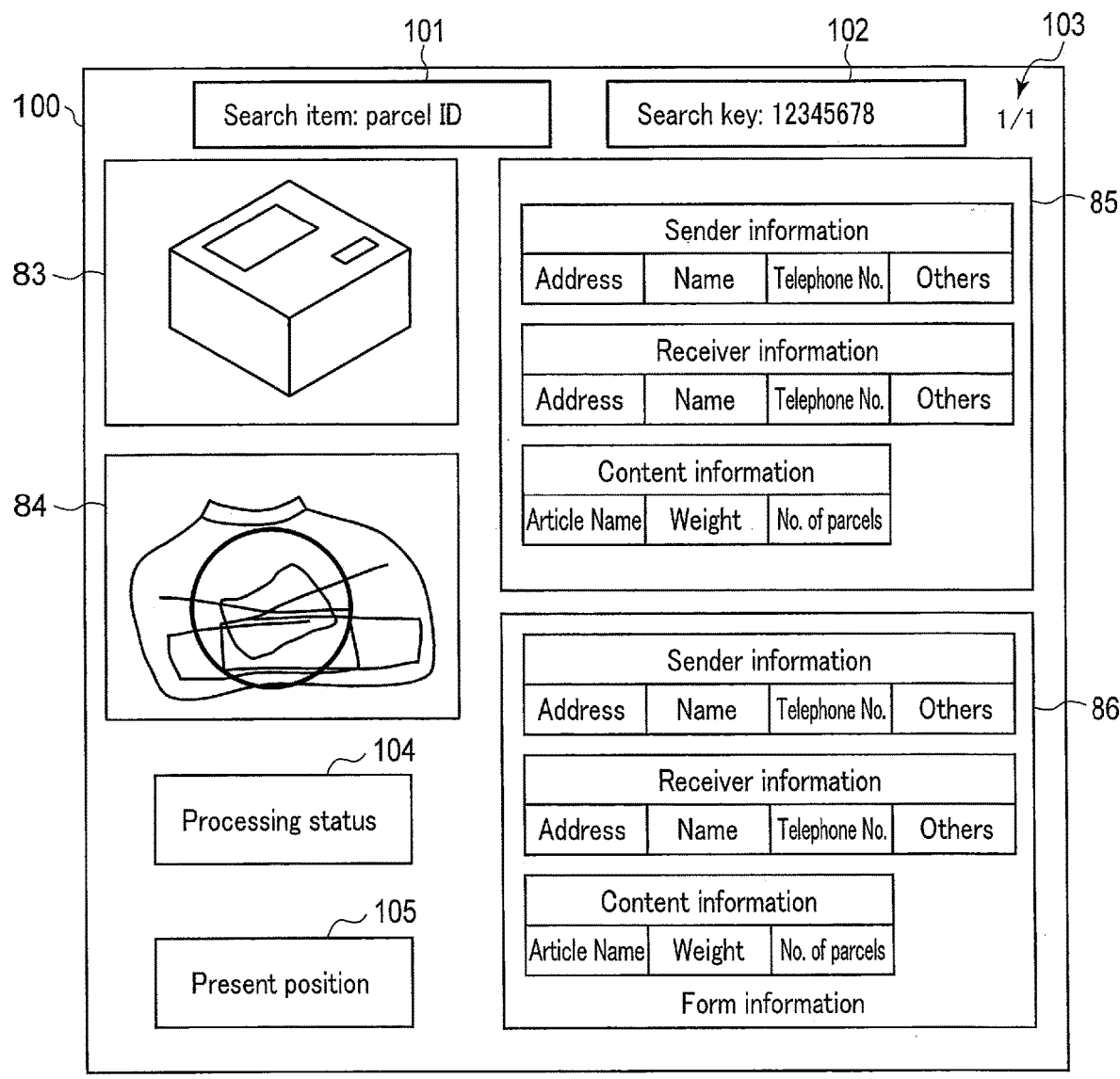
FIG. 17 is a view illustrating an example of a detailed screen which displays in detail the information of a parcel searched by the upper-level apparatus functioning as the information management apparatus according to the embodiment.

FIG. 17 is a view illustrating a display example of a detailed screen 100 which displays the information of a searched parcel in detail.

Like the confirmation screen 81 illustrated in FIG. 12, the detailed screen 100 illustrated in FIG. 17 displays the external appearance image 83, X-ray image 84, advance data 85, form information 86, and the like. In addition, the detailed screen 100 displays a display field 101 of a search item, a display field 102 of a search key, and a display field 103 of the number of search results. The display field 101 of the search item displays a designated search item. For example, if the search item is not designated, the display field 101 of the search item may be blank, or may display "all". The display field 102 of the search key displays a keyword designated as the search key. For example, the search key displayed in the display field 102 is a parcel ID. However, the search key displayed in the display field 102 is not limited to the parcel ID, and may be, for example, information included in sender information or destination information.

Furthermore, the detailed screen 100 displays a display field 104 that displays the processing status of the parcel, and a display field 105 that displays the present position. The display field 104 displays the information indicative of the processing status of the parcel, which was determined in the above-described ST79. In addition, the display field 105 displays the information indicative of the present position of the parcel, which was determined in the above-described ST79.

In addition, when the information of the searched parcel is displayed by the table display (ST80, YES), the processor 11 causes the search terminal 6 to display a table screen that displays the information of each searched parcel in a table format (ST82). For example, the table screen displays the information of each searched parcel as a table in a list format, and the search terminal 6 is caused to display a table indicating a part of the information acquired in the 0th-order process with respect to each parcel, the processing status of the parcel, and the present position of the parcel.

Figure 18:
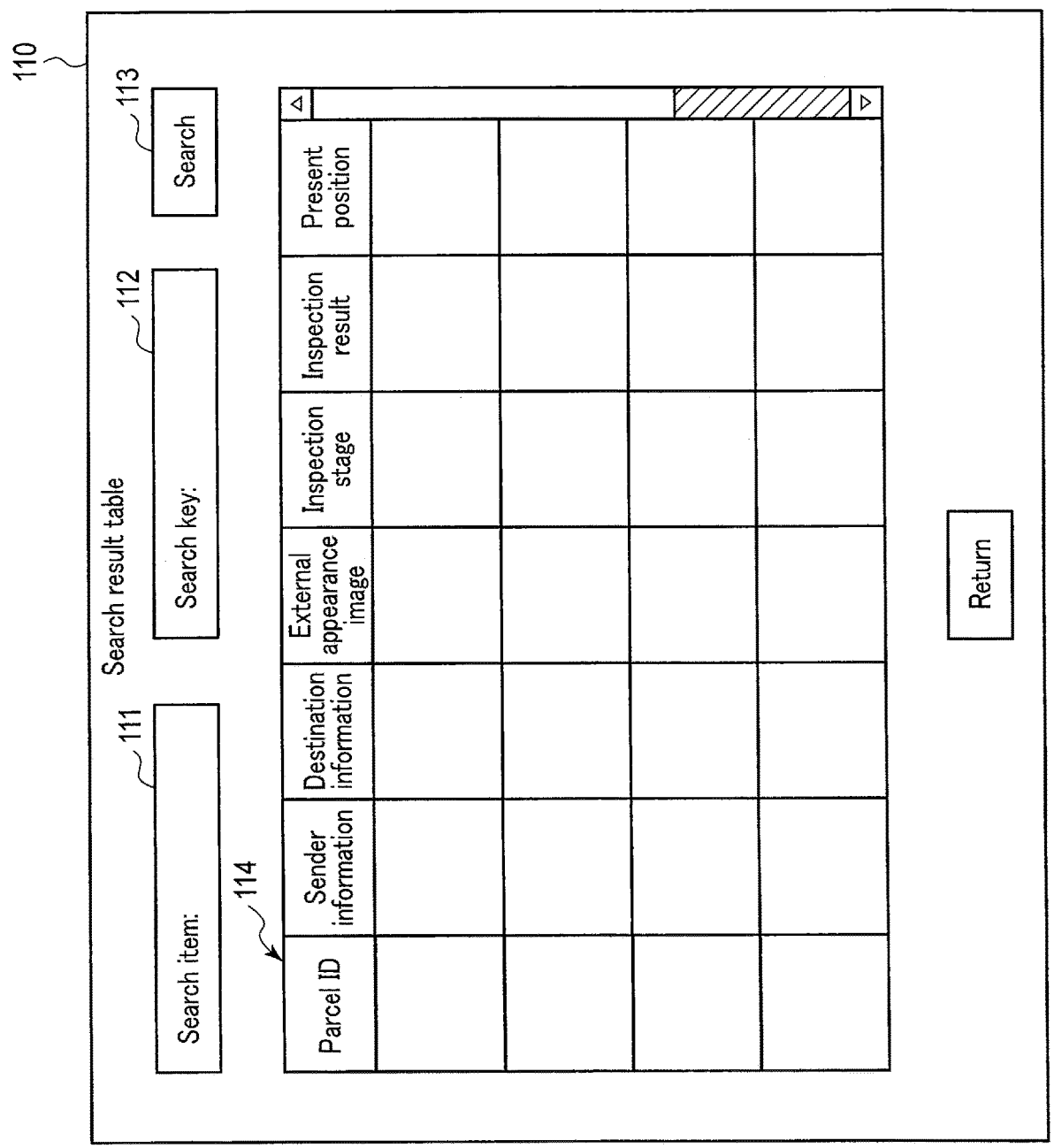
FIG. 18 is a view illustrating an example of a table display screen which displays, in a table format, the information of parcels searched by the upper-level apparatus functioning as the information management apparatus according to the embodiment.

FIG. 18 is a view illustrating a display example of a table display screen 110 which displays, in a table format, the information of searched parcels.

The table display screen 110 illustrated in FIG. 18 displays a display field 111 of a search item, a display field 112 of a search key, a search button 113, and a table 114 which indicates the information of each searched parcel in a list format. The display field ill of the search item displays a designated search item. For example, if the search item is not designated, the display field ill of the search item may be blank, or may display "all". The display field 112 of the search key displays a keyword designated as the search key. For example, the search key displayed in the display field 112 is not limited to the parcel ID, and may be, for example, information included in sender information or destination information. The search button 113 is a button for instructing the execution of the search. For example, the search can be executed by instructing the search button when the search item or search key has been changed.

In addition, in the example illustrated in FIG. 18, the table 114 displays, with respect to each searched parcel, a parcel ID, sender information, destination information, an external appearance image, an inspection stage, an inspection result, and a present position. The display of a part of the information, such as the sender information, destination information and external image, may be omitted in consideration of the display space. The inspection stage and the inspection result display the information corresponding to the processing status determined in ST79. Besides, the present position displays the information indicative of the present position of the parcel determined in ST79.

According to the above-described parcel search process, the operator can easily confirm, with respect to each parcel, in which inspection step in the inspection system the parcel is being processed, and where the parcel is located at present. In addition, by the search item and search key designated by the operator, the corresponding parcel can easily be searched, and the operator can easily recognize the present position and the processing status in regard to the parcel searched under various search conditions. As a result, when a specific parcel is searched from the inspection system, since the operator can easily understand the present position, the operator can easily find the actual parcel that is searched.

While certain embodiments of the present invention have been described, these embodiments have been presented by way of example only, and are not intended to limit the scope of the invention. These novel embodiments may be implemented in a variety of other forms, and various omissions, substitutions and changes may be made without departing from the spirit of the inventions. These embodiments and modifications thereof are included in the scope and spirit of the invention, and included in the scope of the inventions of the accompanying claims and their equivalents.

The invention claimed is:

1. An information management system comprising:
a conveyor system;
a communication interface configured to communicate with an information acquisition apparatus configured to acquire information of a parcel, with a first inspection apparatus configured to inspect the parcel in a first stage, with a second inspection apparatus configured to inspect the parcel in a second stage, and with a search terminal, wherein the first and second stages are performed at first and second inspection sites that are separately located from each other and coupled via the conveyor system;
a memory configured to store, via the communication interface, information of the parcel acquired from the information acquisition apparatus and first and second inspection results acquired for the parcel in the first and second stages, the first and second inspection results being acquired from the first and second inspection apparatuses, the information of the parcel acquired from the information acquisition apparatus including at least one of identification information for identifying the parcel, image data captured by photographing the parcel, destination information of the parcel, and sender information of the parcel, the first and second inspection results including information indicating whether the first and second inspection results are normal, or indicating that a corresponding inspection is yet to be executed; and
a first processor (a) configured to extract, as a target parcel, a parcel with respect to which identification information designated from the search terminal for searching information stored in the memory agrees with part of the information of the parcel stored in the memory, and (b) configured to cause the search terminal to display a present position of the target parcel, based on the first and second inspection results for the target parcel after the target parcel is conveyed away from the first inspection site when the first inspection result is not normal; and
a second processor configured to convey the target parcel between the first and second inspection sites via the conveyor system when the first inspection result is not normal,
wherein, when the identification information designated from the search terminal is not registered in the memory, the search terminal is caused to display unique information of the target parcel.

2. The information management system of claim 1, wherein the first processor is configured to determine the present position of the target parcel, based on a combination of whether the information of the parcel is stored in the memory, and whether the first and second inspection results are normal.

3. The information management system of claim 1, wherein when one parcel is selected from the search terminal after the search terminal is caused to display the unique information of the parcel, the identification information of which is not registered in the memory, the first processor is configured to register identification information of the parcel searched from the search terminal in the unique information of the selected parcel.

4. The information management system of claim 2, wherein when one parcel is selected from the search terminal after the search terminal is caused to display the unique information of the parcel, the identification information of which is not registered in the memory, the first processor is configured to register identification information of the parcel searched from the search terminal in the unique information of the selected parcel.

5. A method performed by an inspection system configured to inspect a parcel, causes the processor to: an inspection system configured to inspect a parcel, the method comprising:
using a first processor to communicate, via a communication interface, with an information acquisition apparatus configured to acquire information of a parcel, with a first inspection apparatus configured to inspect the parcel in a first stage, a second inspection apparatus configured to inspect the parcel in a second stage, and with a search terminal, wherein the first and second stages are performed at first and second inspection sites that are separately located from each other and coupled via a conveyor system;
using the first processor to cause a memory to store, via the communication interface, the information of the parcel acquired from the information acquisition apparatus and first and second inspection results acquired for the parcel in the first and second stages, the information of the parcel acquired from the information acquisition apparatus including at least one of identification information for identifying the parcel, image data captured by photographing the parcel, destination information of the parcel, and sender information of the parcel, the first and second inspection results including information indicating whether the first and second inspection results are normal, or indicating that a corresponding inspection is yet to be executed;

using the first processor to extract, as a target parcel, a parcel with respect to which identification information designated from the search terminal for searching information stored in the memory agrees with part of the information of the parcel stored in the memory; and using a second processor to convey the target parcel between the first and second inspection sites via the conveyor system when the first inspection result is not normal; and using the first processor to cause the search terminal to display a present position of the target parcel, based on the first and second inspection results for the target parcel after the target parcel is conveyed away from the first inspection site toward the second inspection site when the first inspection result is not normal, wherein, when the identification information designated from the search terminal is not registered in the memory, the search terminal is caused to display unique information of the target parcel.

6. The method of claim 5, wherein the first processor is configured to determine the present position of the target parcel, based on a combination of whether the information of the parcel is stored in the memory, and whether the first and second inspection results are normal.

7. The method of claim 5, wherein when one parcel is selected from the search terminal after the search terminal is caused to display the information of the parcel, the identification information of which is not registered in the memory, the first processor is configured to register identification information of the parcel searched from the search terminal in the unique information of the selected parcel.

8. The method of claim 6, wherein when one parcel is selected from the search terminal after the search terminal is caused to display the information of the parcel, the identification information of which is not registered in the memory, the first processor is configured to register identification information of the parcel searched from the search terminal in the unique information of the selected parcel.

9. The information management apparatus of claim 1, wherein the information of the parcel acquired from the information acquisition apparatus is the image data captured by photographing the parcel.

10. The method of claim 5, wherein the information of the parcel acquired from the information acquisition apparatus is the image data captured by photographing the parcel.

11. The information management apparatus of claim 1, wherein the first and second inspection sites are separated by a conveyance path.

12. The method of claim 5, wherein the first and second inspection sites are separated by a conveyance path.

13. The information management apparatus of claim 11, wherein the parcel is conveyed along the conveyance path between the first and second inspection sites based on the first inspection result.

14. The method of claim 12, wherein the parcel is conveyed along the conveyance path between the first and second inspection sites based on the first inspection result.

* * * * *